(12) United States Patent  
Uchida et al.

(10) Patent No.: US 9,341,904 B2
(45) Date of Patent: May 17, 2016

(54) LIQUID-CRYSTAL DISPLAY APPARATUS WITH LARGE VIEWING ANGLE AND HIGH OPTICAL TRANSMITTANCE

(71) Applicant: Sharp Kabushiki Kaisha, Osaka-shi, Osaka (JP)

(72) Inventors: Seiichi Uchida, Osaka (JP); Seiji Kaneko, Osaka (JP); Yasuyuki Ogawa, Osaka (JP); Yutaka Takamaru, Osaka (JP); Kohhei Tanaka, Osaka (JP); Mitsuhiro Murata, Osaka (JP); Akira Shibazaki, Osaka (JP); Ken Kuboki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/390,460

(22) PCT Filed: Mar. 15, 2013

(86) PCT No.: PCT/JP2013/057395
§ 371 (c)(1),
(2) Date: Oct. 3, 2014

(87) PCT Pub. No.: WO2013/150876
PCT Pub. Date: Oct. 10, 2013

(65) Prior Publication Data
US 2015/0049290 A1 Feb. 19, 2015

(30) Foreign Application Priority Data

Apr. 4, 2012 (JP) .................. 2012-085803

(51) Int. Cl.
*G02F 1/1362* (2006.01)
*G02F 1/1343* (2006.01)
(52) U.S. Cl.
CPC .... *G02F 1/136286* (2013.01); *G02F 1/134309* (2013.01)

(58) Field of Classification Search
CPC .................. G01F 1/136286; G01F 1/134309; G02F 2001/13625; G02F 1/1362
See application file for complete search history.

(56) References Cited

U.S. PATENT DOCUMENTS 6,577,368 B1 6/2003 Yuh et al.
6,661,488 B1 12/2003 Takeda et al.
(Continued)

FOREIGN PATENT DOCUMENTS

JP 11-242225 A 9/1999
JP 2002-357830 A 12/2002
(Continued)

OTHER PUBLICATIONS

JP2010-145871,Jan. 2010, machine translation.*
(Continued)

*Primary Examiner* — Tracie Y Green
(74) *Attorney, Agent, or Firm* — Keating & Bennett, LLP

(57) ABSTRACT

The TFT substrate (10) of this liquid crystal display device (100) includes: a TFT (11) which is provided for each pixel; an upper electrode (12) which is electrically connected to the TFT's drain electrode (11*d*); a lower electrode (13) which is arranged under the upper electrode; and a dielectric layer (14) which is arranged between the upper and lower electrodes. Its counter substrate (20) includes a counter electrode (21) which faces the upper electrode. The upper electrode has first and second regions (R1, R2) which have mutually different electrode structures, and a third region (R3) which electrically connects the first and second regions to the drain electrode. The third region of the upper electrode includes a symmetrical connecting portion (12*c*) that is a conductive film pattern, of which the shape is substantially symmetrical with respect to a virtual line (L1) that splits each pixel into two adjacent regions in a row direction.

15 Claims, 21 Drawing Sheets

(56) References Cited

U.S. PATENT DOCUMENTS

| | | |
|---|---|---|
| 6,958,791 B2 | 10/2005 | Shimoshikiryo |
| 7,034,789 B2 | 4/2006 | Takeuchi et al. |
| 7,113,241 B2 | 9/2006 | Hanaoka |
| 2003/0048401 A1 | 3/2003 | Hanaoka et al. |
| 2010/0157228 A1 | 6/2010 | Sakurai et al. |
| 2012/0043541 A1 | 2/2012 | Godo et al. |
| 2012/0138922 A1 | 6/2012 | Yamazaki et al. |

FOREIGN PATENT DOCUMENTS

| | | |
|---|---|---|
| JP | 2003-149647 A | 5/2003 |
| JP | 2004-062146 A | 2/2004 |
| JP | 2004-078157 A | 3/2004 |
| JP | 2006-003840 A | 1/2006 |
| JP | 2010-145871 A | 7/2010 |
| JP | 2012-064932 A | 3/2012 |
| JP | 2012-134475 A | 7/2012 |
| WO | 2012/090773 A1 | 7/2012 |

OTHER PUBLICATIONS

JP2012-64932, Mar. 2012 machine translation.*

Jp2600-3840,mchine translation, Jan. 2006.*

Official Communication issued in International Patent Application No. PCT/JP2013/057395, mailed on Jun. 18, 2013.

* cited by examiner

LIQUID-CRYSTAL DISPLAY APPARATUS WITH LARGE VIEWING ANGLE AND HIGH OPTICAL TRANSMITTANCE

TECHNICAL FIELD

The present invention relates to a liquid crystal display device.

BACKGROUND ART

Recently, the display performances of liquid crystal display devices have been improved to the point that more and more manufacturers use them in TV receivers, for example. The viewing angle characteristic of liquid crystal display devices has been improved to a certain degree but is not satisfactorily in some respects. Among other things, there is still a high demand for improvement of the viewing angle characteristic of a liquid crystal display device which uses a vertical alignment liquid crystal layer. A liquid crystal display device with a vertical alignment liquid crystal layer is sometimes called a "VA (Vertical Alignment) mode liquid crystal display device".

A VA mode liquid crystal display device which is currently used for a display device with a big screen such as a TV set adopts an alignment division structure in which multiple liquid crystal domains are formed in a single pixel to improve the viewing angle characteristic. An MVA (Multi-domain Vertical Alignment) mode is often adopted as a method of forming such an alignment division structure. The MVA mode is disclosed in Patent Document No. 1, for example.

Specifically, according to the MVA mode, an alignment control structure is provided on each of the two substrates, which face each other with a vertical alignment liquid crystal layer interposed between them, so as to contact with the liquid crystal layer, thereby forming multiple liquid crystal domains with mutually different alignment directions (i.e., tilt directions), the number of which is typically four, in each pixel. As the alignment control structure, a slit (as a hole) or a rib (as a projection structure) may be provided for an electrode, thereby creating an alignment controlling force from both sides of the liquid crystal layer.

If such a slit or rib is adopted, however, the alignment controlling force will be applied onto liquid crystal molecules non-uniformly within a pixel, because the slit or rib has a linear structure unlike the situation where the pretilt directions are defined by an alignment film in a conventional TN (twisted nematic) mode LCD. As a result, the response speed may have a distribution unintentionally.

In order to improve the responsivity of the MVA mode, so-called "PSA (Polymer Sustained Alignment) technology" has been developed recently. The PSA technology is disclosed in Patent Documents Nos. 2 and 3. According to the PSA technology, to give a pretilt to liquid crystal molecules, a polymer layer, which is called an "alignment sustaining layer", is used. The alignment sustaining layer is formed by polymerizing a photo-polymerizable monomer, which has been added in advance to the liquid crystal material, with a voltage applied to the liquid crystal layer after a liquid crystal cell is completed. By adjusting the distribution and intensity of an electric field to be applied to polymerize the monomer, the pretilt azimuth (i.e., azimuth angle within a substrate plane) and pretilt angle (i.e., an elevation angle with respect to the substrate plane) of the liquid crystal molecules can be controlled.

Meanwhile, Patent Document No. 3 discloses a configuration in which a pixel electrode with a fine-line striped pattern (which is sometimes called a "fishbone type pixel electrode") is used in combination with the PSA technology. According to such a configuration, when a voltage is applied to the liquid crystal layer, the liquid crystal molecules will be aligned parallel to the longitudinal direction of the striped pattern, which is in sharp contrast to the conventional MVA mode disclosed in Patent Document No. in which the liquid crystal molecules are aligned perpendicularly to the linear alignment control structure such as slits or ribs. The lines and spaces of the fine-line striped pattern may have a narrower width than the conventional MVA mode alignment control structure. That is why the fishbone type pixel electrode is applicable more easily to small pixels than the conventional MVA mode alignment control structure is.

According to these modified VA mode technologies (including the PSA technology and the fishbone type pixel electrode), an excellent viewing angle characteristic is realized. Recently, however, since there is a growing demand for further improvement of the viewing angle characteristic of VA mode liquid crystal display devices, a so-called "pixel division driving technique" has been incorporated into actual products one after another (see Patent Documents Nos. 4 and 5, for example).

According to the pixel division driving technique, the phenomenon that the γ (gamma) characteristic when the screen is viewed straight on is different from the γ (gamma) characteristic when the screen is viewed obliquely, i.e., the viewing angle dependence of the γ characteristic, can be significantly reduced. In this case, the γ characteristic is the grayscale dependence of the display luminance.

Also, according to the pixel division driving technique, a single pixel is comprised of a plurality of subpixels which can apply mutually different voltages to the liquid crystal layer (i.e., which can exhibit mutually different luminances), and a predetermined luminance corresponding to the display signal voltage to be input to a pixel is realized by the entire pixel. That is to say, the pixel division driving technique is a technique for reducing the viewing angle dependence of a pixel's γ characteristic by synthesizing together mutually different γ characteristics of a plurality of subpixels.

CITATION LIST

Patent Literature

Patent Document No. 1: Japanese Laid-Open Patent Publication No. 11-242225
Patent Document No. 2: Japanese Laid-Open Patent Publication No. 2002-357830
Patent Document No. 3: Japanese Laid-Open Patent Publication No. 2003-149647
Patent Document No. 4: Japanese Laid-Open Patent Publication No. 2004-62146
Patent Document No. 5: Japanese Laid-Open Patent Publication No. 2004-78157

SUMMARY OF INVENTION

Technical Problem

If the pixel division driving technique is adopted, however, different effective voltages need to be applied to the liquid crystal layer from one subpixel to another, and therefore, the pixel electrode provided for each pixel includes a plurality of subpixel electrodes associated with its subpixels, and switching elements (such as TFTs) are provided for the respective subpixel electrodes. That is to say, since at least two switching elements are provided for each pixel, the aperture ratio and optical transmittance of each pixel both decrease. And such a decrease in aperture ratio and optical transmittance is particularly noticeable in a high-definition liquid crystal display device, of which each pixel has a small area.

The present inventors perfected our invention in order to overcome these problems by providing a liquid crystal display device which has an excellent viewing angle characteristic and each pixel of which has a sufficiently high optical transmittance.

Solution to Problem

A liquid crystal display device according to an embodiment of the present invention includes: an active-matrix substrate; a counter substrate which faces the active-matrix substrate; and a liquid crystal layer which is interposed between the active-matrix substrate and the counter substrate. The liquid crystal display device includes a plurality of pixels which are arranged in columns and rows to form a matrix pattern. The active-matrix substrate includes: a thin-film transistor which is provided for each of the plurality of pixels and which includes a gate electrode, a source electrode, and a drain electrode; an upper electrode which is electrically connected to the drain electrode of the thin-film transistor; a lower electrode which is arranged under the upper electrode; and a dielectric layer which is arranged between the upper and lower electrodes. The counter substrate includes a counter electrode which faces the upper electrode. The upper electrode has first and second regions which have mutually different electrode structures, and a third region which electrically connects the first and second regions to the drain electrode. The third region of the upper electrode includes a symmetrical connecting portion that is a conductive film pattern, of which the shape is substantially symmetrical with respect to a virtual line that splits each pixel into two adjacent regions in a row direction.

In one embodiment, the active-matrix substrate further includes an interlayer insulating layer which is provided to cover the thin-film transistor. A contact hole is formed in the interlayer insulating layer and the dielectric layer so that the drain electrode is partially exposed in the contact hole and that the third region of the upper electrode is electrically connected to the drain electrode inside the contact hole. And the center of the contact hole is located off the virtual line.

In one embodiment, the active-matrix substrate further includes: a scan line which is extended substantially parallel to the row direction and which is electrically connected to the gate electrode of the thin-film transistor; and a signal line which is extended substantially parallel to the column direction and which is electrically connected to the source electrode of the thin-film transistor.

In one embodiment, an electric field to be generated in a region of the liquid crystal layer over the first region of the upper electrode and an electric field to be generated in another region of the liquid crystal layer over the second region of the upper electrode when a voltage is applied to the liquid crystal layer have mutually different directions and/or intensities.

In one embodiment, if a particular one of the plurality of pixels displays a predetermined half-scale tone, the luminance in a region of the particularly pixel corresponding to the first region of the upper electrode is lower than the luminance in another region of the particular pixel corresponding to the second region of the upper electrode.

In one embodiment, a plurality of slits are formed in the first region of the upper electrode, but no slits are formed in the second region of the upper electrode.

In one embodiment, when a voltage is applied to the liquid crystal layer, liquid crystal molecules are aligned substantially parallel to the slits in a region of the liquid crystal layer over the first region of the upper electrode, and liquid crystal molecules are aligned radially in another region of the liquid crystal layer over the second region of the upper electrode.

In one embodiment, the third region of the upper electrode is continuous with the first region.

In one embodiment, the third region of the upper electrode is continuous with the second region.

In one embodiment, the liquid crystal layer is a vertical alignment liquid crystal layer.

In one embodiment, at least one of the active-matrix substrate and the counter substrate includes a vertical alignment film and an alignment sustaining layer which is arranged between the vertical alignment film and the liquid crystal layer and which defines the pretilt azimuth of liquid crystal molecules when no voltage is applied to the liquid crystal layer.

In one embodiment, mutually different potentials are applied to the upper and lower electrodes.

In one embodiment, the upper and lower electrodes are each made of a transparent conductive material.

In one embodiment, when viewed along a normal to a display screen, the upper electrode overlaps at least partially with the lower electrode with the dielectric layer interposed between them, and the upper electrode, the dielectric layer and the lower electrode together form a storage capacitor.

In one embodiment, the liquid crystal display device further includes a pair of polarizers which face each other with the liquid crystal layer interposed between them.

In one embodiment, the thin-film transistor includes an oxide semiconductor layer.

In one embodiment, the oxide semiconductor layer includes an In—Ga—Zn—O based semiconductor.

Advantageous Effects of Invention

Embodiments of the present invention provide a liquid crystal display device which has an excellent viewing angle characteristic and each pixel of which has a sufficiently high optical transmittance.

DESCRIPTION OF EMBODIMENTS

Hereinafter, embodiments of the present invention will be described with reference to the accompanying drawings. It should be noted that the present invention is in no way limited to the embodiments to be described below.

(Embodiment 1)

Figure 1:
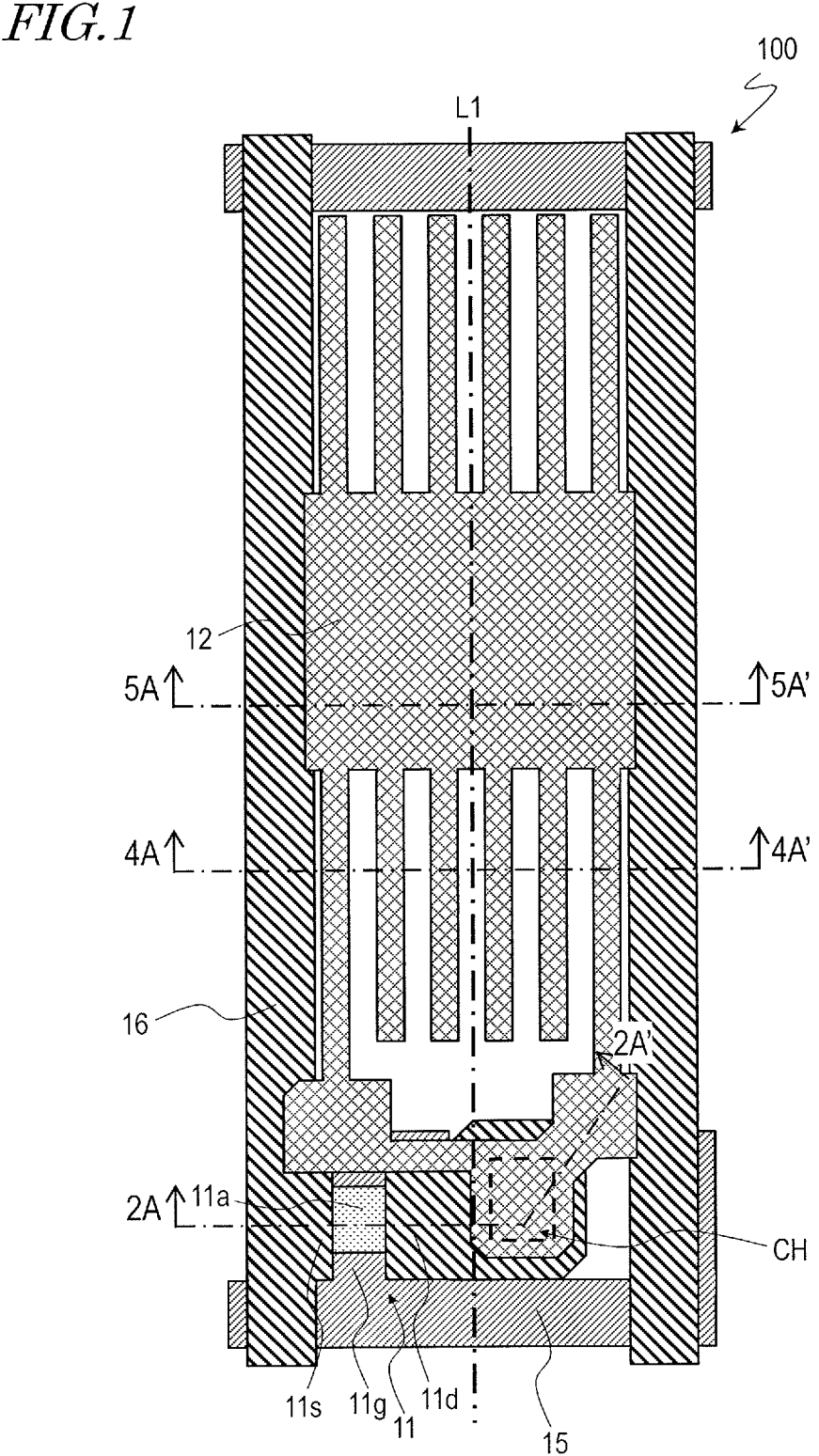
FIG. 1 A plan view schematically illustrating a single pixel of a liquid crystal display device 100 as an embodiment of the present invention.
Figure 2:
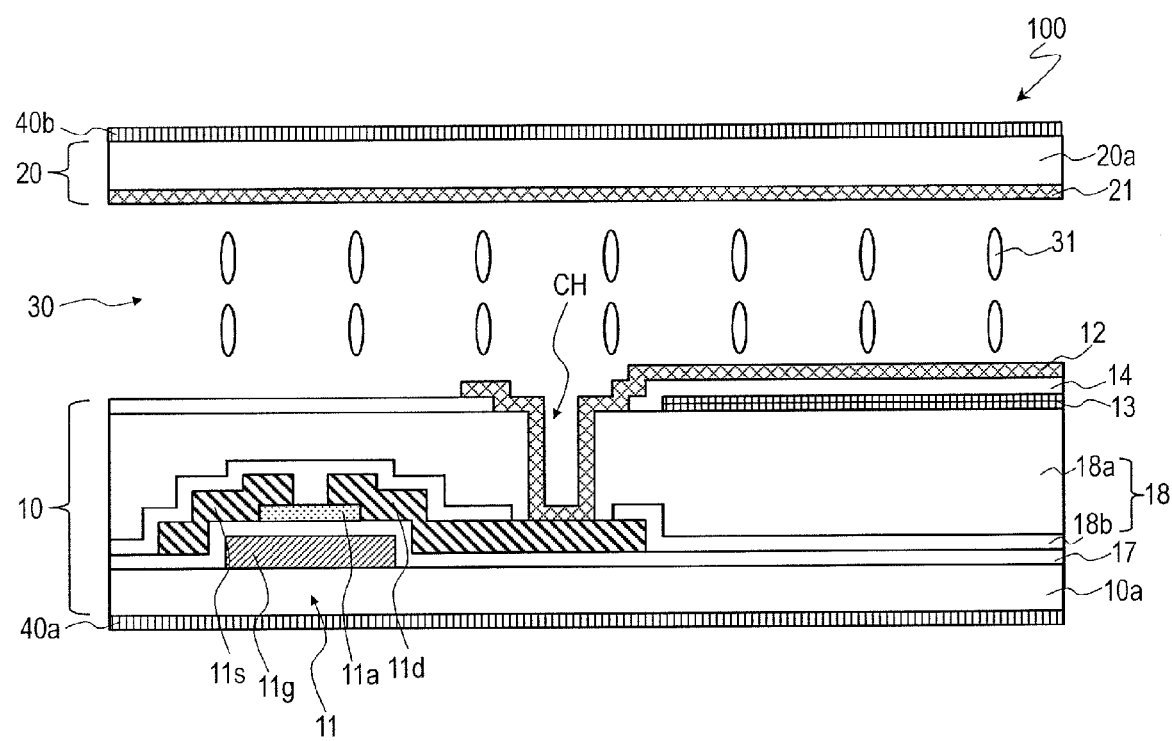
FIG. 2 A cross-sectional view schematically illustrating a liquid crystal display device 100 according to an embodiment of the present invention as viewed on the plane 2A-2A' shown in FIG. 1.

FIGS. 1 and 2 illustrate a liquid crystal display device 100 as a first embodiment of the present invention. This liquid crystal display device 100 includes a plurality of pixels which are arranged in columns and rows to form a matrix pattern.

FIG. 1 is a plan view schematically illustrating a single pixel of the liquid crystal display device 100, and FIG. 2 is a cross-sectional view as viewed on the plane 2A-2A' shown in FIG. 1.

The liquid crystal display device 100 includes an active-matrix substrate (which will be referred to herein as a "TFT substrate") 10, a counter substrate 20 which faces the TFT substrate 10, and a liquid crystal layer 30 which is interposed between the TFT substrate 10 and the counter substrate 20.

The TFT substrate 10 includes thin-film transistors (TFTs) 11, which are provided for respective pixels. Each TFT 11 includes a semiconductor layer 11a, a gate electrode 11g, a source electrode 11s and a drain electrode 11d. In this embodiment, only one TFT 11 is provided for each pixel.

The TFT substrate 10 further includes an upper electrode (first electrode) 12 which is electrically connected to the drain electrode 11d of the TFT 11, a lower electrode (second electrode) 13 which is arranged under the upper electrode 12, and a dielectric layer 14 which is arranged between the upper and lower electrodes 12 and 13. Mutually different potentials are applied to the upper and lower electrodes 12 and 13. The upper and lower electrodes 12 and 13 are each made of a transparent conductive material (such as ITO). When viewed along a normal to the display screen, the upper electrode 12 overlaps at least partially with the lower electrode 13 with the dielectric layer 14 interposed between them. And the upper electrode 12, the dielectric layer 14 and the lower electrode 13 together form a storage capacitor.

The TFT substrate 10 further includes a scan line (gate bus line) 15 which is extended substantially parallel to the row direction, and a signal line (source bus line) 16 which is extended substantially parallel to the column direction. The scan line 15 is electrically connected to the gate electrode 11g of the TFT 11 and supplies a scan signal to the TFT 11. The signal line 16 is electrically connected to the source electrode 11s of the TFT 11 and supplies a display signal to the TFT 11.

These components of the TFT substrate 10 are supported by a transparent insulating substrate (such as a glass substrate) 10a. On the surface of the insulating substrate 10a, the gate electrode 11g and scan line 15 of the TFT 11 are arranged to face the liquid crystal layer 30 and are covered with a gate insulating layer 17.

On the gate insulating layer 17, arranged is a semiconductor layer 11a which functions as the channel, source and drain regions of the TFT 11. The semiconductor layer 11a may be made of any of various known semiconductor materials, examples of which include amorphous silicon, polysilicon and continuous grain silicon (CGS).

Also, the semiconductor layer 11a may be an oxide semiconductor layer, which may include an In—Ga—Zn—O based semiconductor, for example. In this case, the In—Ga—Zn—O based semiconductor is a ternary oxide of In (indium), Ga (gallium) and Zn (zinc). The ratios (i.e., mole fractions) of In, Ga and Zn are not particularly limited. For example, In:Ga:Zn=2:2:1, In:Ga:Zn=1:1:1 or In:Ga:Zn=1:1:2 may be satisfied. The In—Ga—Zn—O based semiconductor may be either amorphous or crystalline. If the In—Ga—Zn—O based semiconductor is a crystalline one, a crystalline In—Ga—Zn—O based semiconductor of which the c axis is substantially perpendicular to the layer plane is suitably used. The crystal structure of such an In—Ga—Zn—C based semiconductor is disclosed, for example, in Japanese Laid-Open Patent Publication No. 2012-134475, the entire disclosure of which is hereby incorporated by reference. A TFT including such an In—Ga—Zn—O based semiconductor layer has high mobility (which is more than 20 times as high as that of an a-Si TFT) and low leakage current (which is less than one hundredth of that of an a-Si TFT).

The oxide semiconductor layer does not have to be an In—Ga—Zn—O based semiconductor layer, but may also include a Zn—O based (ZnO) semiconductor, an In—Zn—O based (IZO) semiconductor, a Zn—Ti—O based (ZTO) semiconductor, a Cd—Ge—O based semiconductor, a Cd—Pb—O based semiconductor, an In—Sn—Zn—O based semiconductor (such as $In_2O_3$—$SnO_2$—ZnO) or an In—Ga—Sn—O based semiconductor, for example.

The source and drain electrodes 11s and 11d are arranged to contact respectively with the source and drain regions of the semiconductor layer 11a. The signal line 16 is also arranged on the gate insulating layer 17.

An interlayer insulating layer 18 is provided to cover the TFT 11 and the signal line 16. In this embodiment, the interlayer insulating layer 18 has a multilayer structure consisting of an inorganic insulating film 18a and an organic insulating film 18b stacked on the inorganic insulating film 18a. The organic insulating film 18b may be made of a photosensitive resin, for example. Naturally, the interlayer insulating layer 18 may also have a single-layer structure.

The lower electrode 13 is arranged on the interlayer insulating layer 18 and is covered with the dielectric layer 14. The upper electrode 12 is arranged on the dielectric layer 14. A contact hole CH is formed in the interlayer insulating layer 18 and the dielectric layer 14 to partially expose the drain electrode 11d. Inside the contact hole CH, the upper electrode 12 (more specifically, its third region R3 (to be described later)) is electrically connected to the drain electrode 11d.

The counter substrate 20 includes a counter electrode (third electrode) 21 which faces the upper electrode 12. Typically, the counter electrode 21 is a common electrode which is shared in common by every pixel. The counter electrode 21 is made of a transparent conductive material (such as ITO). Although not shown, the counter substrate 20 typically further includes color filters and an opaque layer (black matrix). The scan lines 15, signal lines 16, TFTs 11 and contact holes CH of the TFT substrate 10 are shielded from light by the opaque layer. The components (including the counter electrode 21) of the counter electrode 21 are supported by a transparent insulating substrate (such as a glass substrate) 20a.

The liquid crystal layer 30 is a vertical alignment liquid crystal layer. That is to say, the liquid crystal molecules 31 included in the liquid crystal layer 30 are aligned substantially perpendicularly to (typically so as to define an angle of 85 degrees or more with respect to) the surface of the substrate as shown in FIG. 2 when no voltage is applied to the liquid crystal layer 30. Although not shown, at least one (typically both) of the TFT substrate 10 and counter substrate 20 includes a vertical alignment film which is provided in contact with the liquid crystal layer 30.

Optionally, an alignment sustaining layer may be formed by the PSA technology as disclosed in Patent Documents Nos. 2 and 3. The alignment sustaining layer is provided between the vertical alignment film and the liquid crystal layer 30, and defines the pretilt azimuth of the liquid crystal molecules 31 when no voltage is applied to the liquid crystal layer 30. The alignment sustaining layer is made of a photo-polymerized material, which may be obtained by photo-polymerizing a photopolymerizable compound added to the liquid crystal material (which is typically a photopolymerizable monomer) by irradiating the compound with an ultraviolet ray, for example, with a voltage applied thereto.

The liquid crystal display device 100 further includes a pair of polarizers 40a and 40b which are arranged to face each other with the liquid crystal layer 30 interposed between them. In the exemplary configuration shown in FIG. 2, these polarizers 40a and 40b are arranged outside of the pair of substrates 10 and 20. These polarizers 40a and 40b are arranged so as to conduct a display operation in the normally black mode in combination with the vertical alignment liquid crystal layer 30. For example, if the polarizers 40a and 40b are linear polarizers, the polarizers 40a and 40b are arranged so that their polarization axes (i.e., either their transmission axes or absorption axes) cross each other substantially at right angles (i.e., as crossed Nicols). Naturally, the polarizers 40a and 40b may also be circular polarizers.

Figure 3:
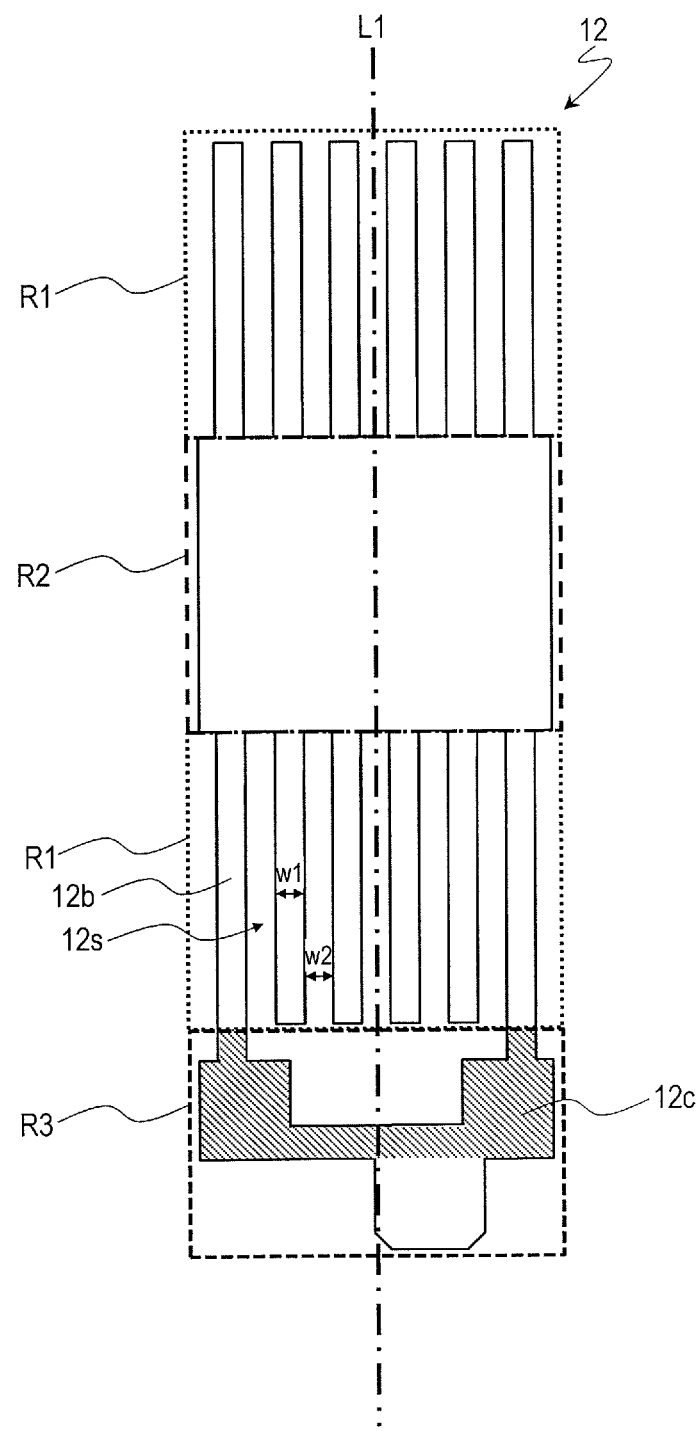
FIG. 3 A plan view schematically illustrating the upper electrode 12 that the liquid crystal display device 100 according to the embodiment of the present invention has.
Figure 4:
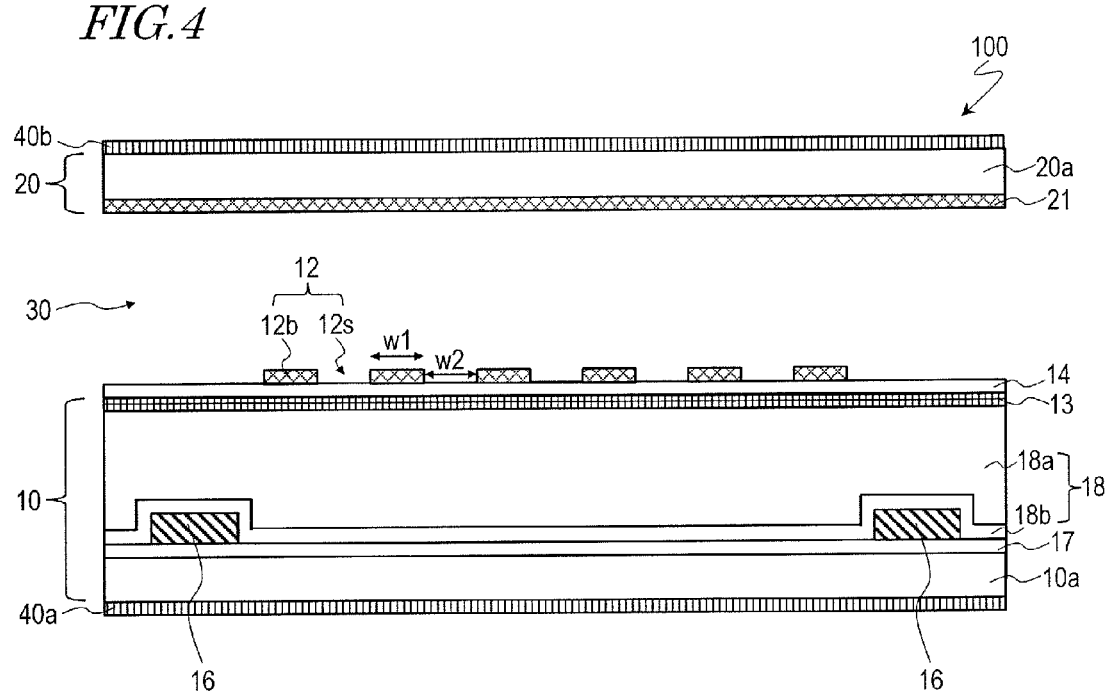
FIG. 4 A cross-sectional view schematically illustrating a liquid crystal display device 100 according to an embodiment of the present invention as viewed on the plane 4A-4A' shown in FIG. 1.
Figure 5:
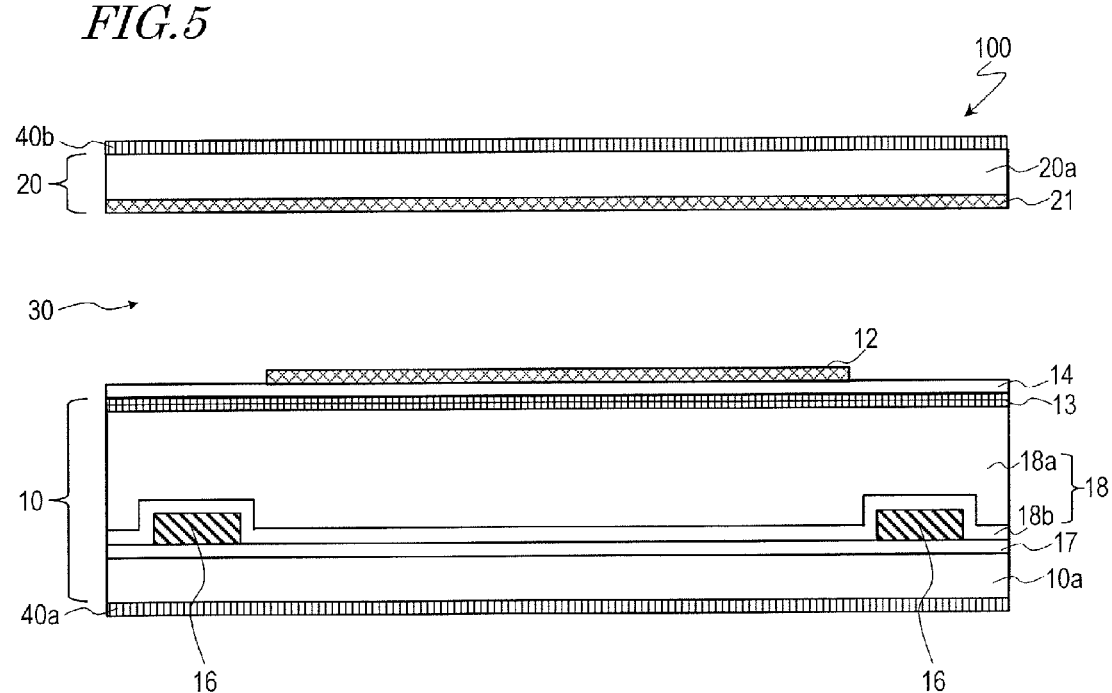
FIG. 5 A cross-sectional view schematically illustrating a liquid crystal display device 100 according to an embodiment of the present invention as viewed on the plane 5A-5A' shown in FIG. 1.

Hereinafter, the structures of the upper and lower electrodes 12 and 13 that the TFT substrate 10 has will be described more specifically with reference to FIGS. 3, 4 and 5. FIG. 3 is a plan view illustrating only the upper electrode 12 of the liquid crystal display device 100 of this embodiment. FIGS. 4 and 5 are cross-sectional views as respectively viewed on the planes 4A-4A' and 5A-5A' shown in FIG. 1.

The upper electrode 12 has first and second regions R1 and R2 which have mutually different electrode structures, and also has a third region R3 to electrically connect the first and second regions R1 and R2 to the drain electrode 11d.

In this embodiment, a plurality of slits 12s are formed (by removing portions of a conductive film) in the first region R1 of the upper electrode 12 as shown in FIGS. 3 and 4. The first region R1 includes a plurality of branch portions 12b which run substantially parallel to each other, and each of those slits 12s is located between two adjacent ones of the branch portions 12b. In this manner, the first region R1 has a comb tooth electrode structure. In the following description, the first region R1 will be sometimes referred to herein as a "slit cut region".

On the other hand, in the second region R2 of the upper electrode 12, there are no slits as shown in FIGS. 3 and 5. That is to say, the second region R2 has a planar (i.e., solid) electrode structure. In the following description, the second region R2 will be sometimes referred to herein as a "slit uncut region" or a "solid region".

Although there are two first regions R1 with the second region R2 interposed between them at the center of the pixel in the exemplary configuration shown in FIG. 3, the numbers and arrangements of the first and second regions R1 and R2 are not limited to the ones illustrated in FIG. 3, as will be described later.

In the exemplary configuration shown in FIG. 3, the third region R3 of the upper electrode 12 is continuous with the first region R1. That is to say, the third region R3 is physically connected to the first region R1. A more specific structure of the third region R3 will be described in detail later.

The lower electrode 13 has been formed so that almost all of the pixel (but its portions over the TFT 11 and near the contact hole CH) is covered with the conductive film. That is to say, the lower electrode 13 is substantially a solid electrode. Naturally, the lower electrode 13 does not have to have such a structure. To generate a lateral electric field (to be described later), however, the lower electrode 13 suitably overlaps with at least some of the slits 12s of the upper electrode 12.

The upper electrode 12 is electrically connected to the drain electrode 11d of the TFT 11, and therefore, a potential corresponding to the display signal supplied through the signal line 16 can be applied to the upper electrode 12. On the other hand, a different potential from the one applied to the upper electrode 12 is applied to the lower electrode 13. Typically, the same potential as the one applied to the counter electrode 21 is applied to the lower electrode 13.

Since the first region (slit cut region) R1 and second region (slit uncut region, or solid region) R2 of the upper electrode 12 have mutually different electrode structures, an electric field to be generated in a region of the liquid crystal layer 30 over the first region R1 and an electric field to be generated in another region of the liquid crystal layer 30 over the second region R2 when a voltage is applied to the liquid crystal layer 30 have mutually different directions and/or intensities. Specifically, a vertical electric field, of which the intensity corresponds to the potential difference between the upper electrode 12 and the counter electrode 21, is generated in a region of the liquid crystal layer 30 over the second region R2. On the other hand, not only the vertical electric field, of which the intensity corresponds to the potential difference between the upper electrode 12 and the counter electrode 21, but also a lateral electric field, of which the intensity corresponds to the potential difference between the upper and lower electrodes 12 and 13, are generated in a region of the liquid crystal layer 30 over the first region R1.

As can be seen, since not only a vertical electric field but also a lateral electric field are generated in the region of the liquid crystal layer 30 over the first region R1, the liquid crystal molecules 31 tilt to a smaller degree in that region of the liquid crystal layer 30 over the first region R1 than in the region of the liquid crystal layer 30 over the second region R2. That is why when a certain pixel displays a predetermined half scale tone, a region of that pixel corresponding to the first region R1 has a lower luminance than another region of the same pixel corresponding to the second region R2. That is to say, two kinds of regions with mutually different luminances are formed within the same pixel. The voltage-transmittance (V-T) characteristic of that region corresponding to the first region R1 (i.e., a relatively dark region) will shift to a higher voltage range compared to the voltage-transmittance (V-T) characteristic of that region corresponding to the second region R2 (i.e., a relatively bright region).

Figure 6:
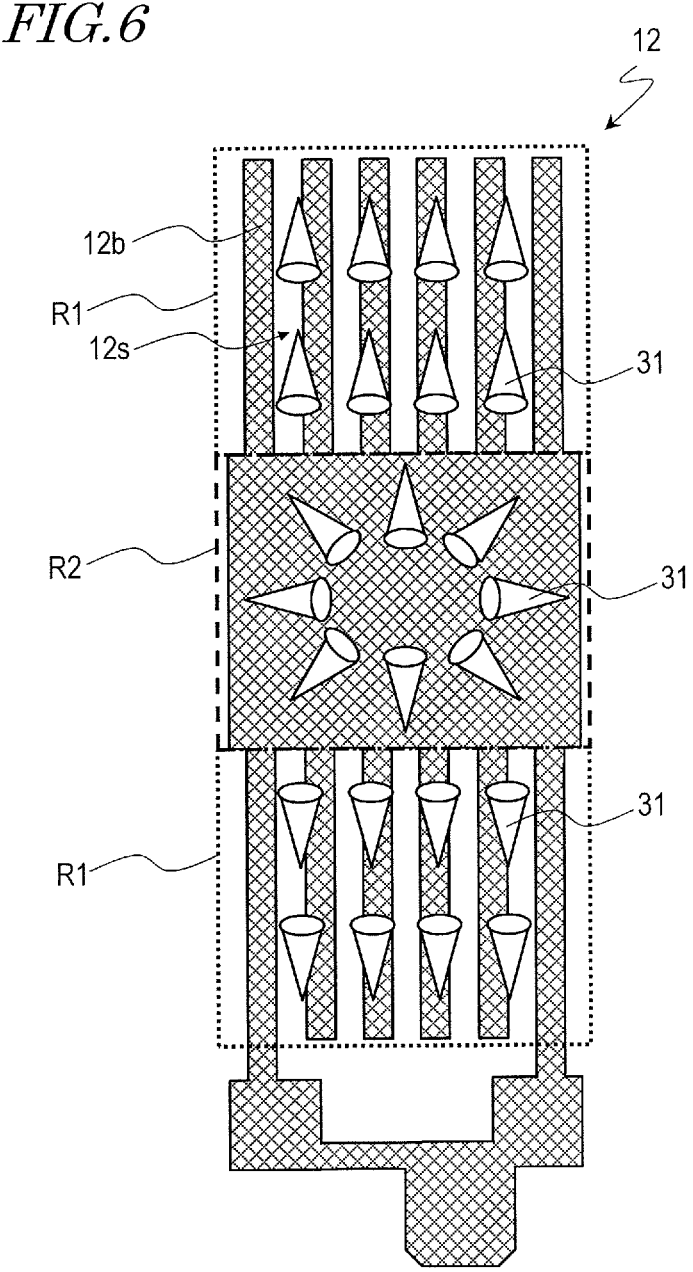
FIG. 6 Schematically illustrates the alignment state of liquid crystal molecules 31 when a voltage is applied to the liquid crystal layer 30 of the liquid crystal display device 100 according to an embodiment of the present invention.

FIG. 6 schematically illustrates the alignment state of liquid crystal molecules 31 when a voltage is applied to the liquid crystal layer 30. As shown in FIG. 6, in the region of the liquid crystal layer 30 over the first region R1 of the upper electrode 12, the liquid crystal molecules 31 are aligned substantially parallel to the slits 12s (i.e., parallel to the branch portions 12b, too). Nevertheless, their alignment azimuth in that region of the liquid crystal layer 30 over the first region R1 in the upper part of the pixel is different by approximately 180 degrees from their alignment azimuth in that region of the liquid crystal layer 30 over the first region R1 in the lower part of the pixel. On the other hand, in the region of the liquid crystal layer 30 over the second region R2 of the upper electrode 12, the liquid crystal molecules 31 are aligned radially (i.e., in every direction).

As described above, in the liquid crystal display device 100 of this embodiment, when a certain pixel displays a predetermined half-scale tone, two kinds of regions with mutually different luminances are created in the same pixel (i.e., two kinds of regions with mutually different voltage-transmittance (V-T) characteristics are created in the same pixel). As a result, the viewing angle dependence of the r characteristic can be reduced. In addition, since there is no need to provide multiple TFTs 11 for each pixel, the liquid crystal display device 100 of this embodiment can increase the aperture ratio and optical transmittance of each pixel sufficiently. Consequently, the liquid crystal display device 100 of this embodiment has an excellent viewing angle characteristic, and each pixel has sufficiently high optical transmittance.

From the standpoint of reducing the viewing angle dependence of the γ characteristic sufficiently, the ratio of the area of the first region R1 (i.e., the combined area of the two first regions R1 in this example) to that of the second region R1 suitably falls within the range of 5 to 1 through 1 to 2, and more suitably falls within the range of 3 to 1 through 1 to 1.

Also, in the first region R1, the branch portions 12b suitably have a width w1 of 2.0 μm to 8.0 μm, and the slits 12s suitably have a width w2 of 2.0 μm to 8.0 μm. The ratio (w1/w2) of the width w1 of the branch portions 12b to the width w2 of the slits 12s suitably falls within the range of 0.4 to 3.0, and more suitably falls within the range of 0.5 to 1.5.

The applicant of the present application proposed a liquid crystal display device which includes an upper electrode and a lower electrode on its TFT substrate and includes a counter electrode on its counter substrate and in which the upper electrode has two kinds of regions with mutually different electrode structures (that are called "slit regions" and "planar regions") in PCT International Application Publication No. 2012/090773, the entire disclosure of which is hereby incorporated by reference.

In that application, however, the structure of the rest of the upper electrode which is used to electrically connect those slit regions and planar regions to a TFT (that is a region in the vicinity of the TFT or the contact hole and that corresponds to the region R3 of the upper electrode 12 in the liquid crystal display device 100 of this embodiment) is not studied particularly specifically. For example, in that application, the regions of the upper electrode in the vicinity of the contact hole and over the TFT are supposed to have a "planar electrode structure" and a conductive film has been formed to cover those regions of the upper electrode entirely.

However, if such a region of the upper electrode located over the TFT had such a structure, the characteristic of the TFT could change. For that reason, the conductive film that functions as the upper electrode is suitably removed from over the TFT. In that case, if the contact hole is located at the center in the horizontal direction, there will be no problem, in particular. In a high-definition liquid crystal panel, however, sometimes the pixel size may be too small to arrange the contact hole at the center in the horizontal direction. As a result, the conductive film that defines a region of the upper electrode to electrically connect the slit regions and planar regions to the TFT will have a horizontally asymmetrical shape, thus debasing the display quality.

Figure 7:
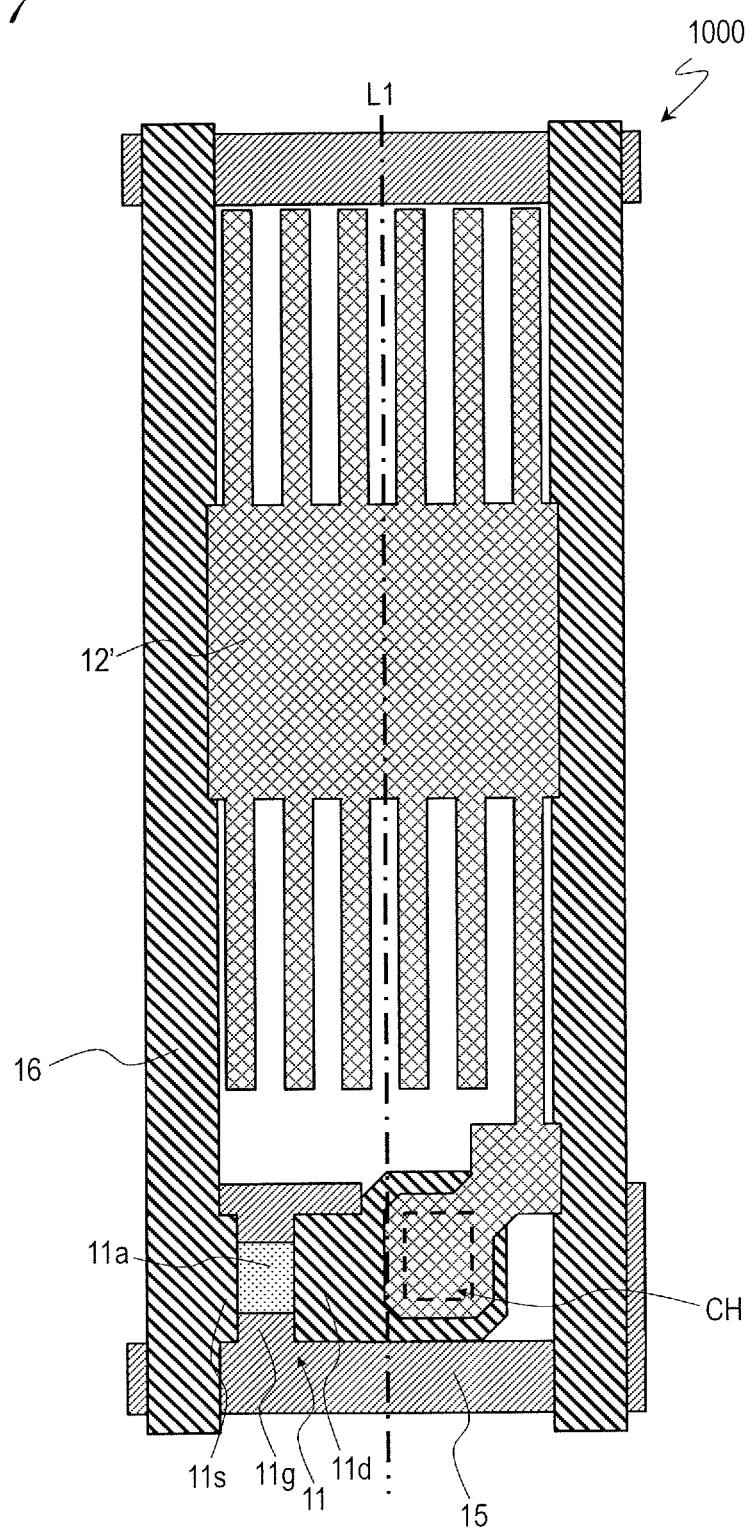
FIG. 7 A plan view schematically illustrating a single pixel of a liquid crystal display device 1000 as a comparative example.
Figure 8:
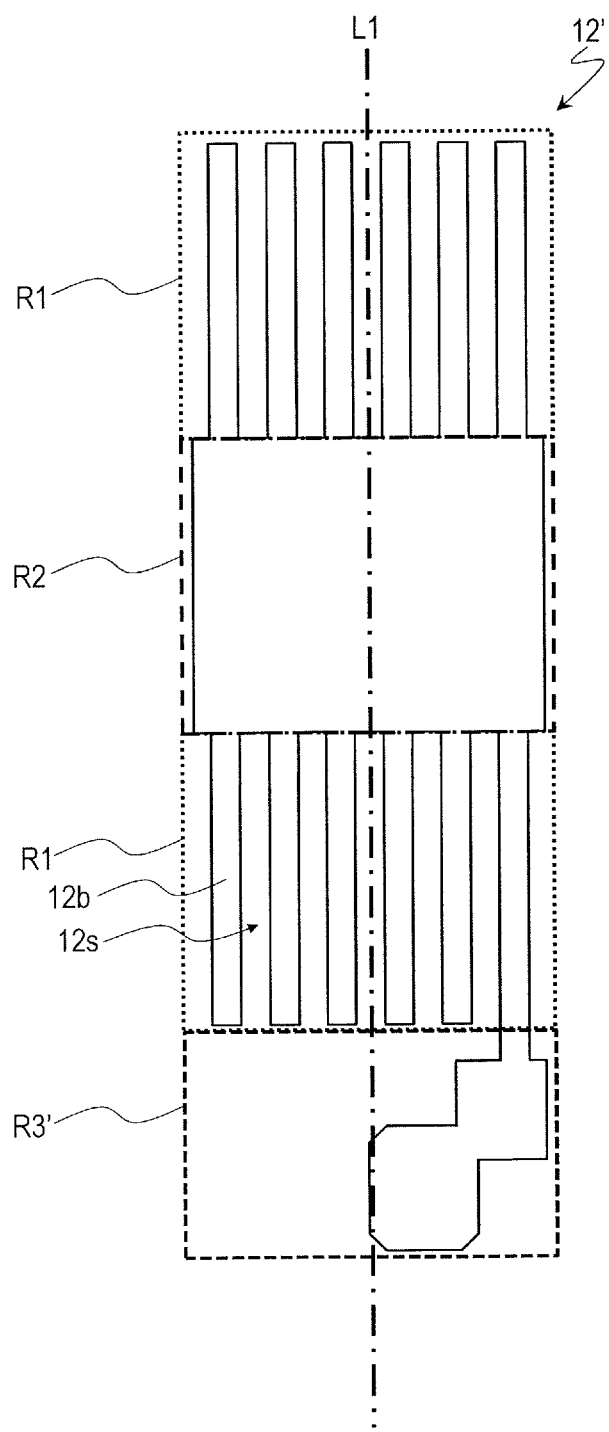
FIG. 8 A plan view schematically illustrating the upper electrode 12' that the liquid crystal display device 1000 of the comparative example has.

In contrast, since the third region R3 of the upper electrode 12 has the structure to be described later in the liquid crystal display device 100 of this embodiment, the decline in display quality described above can be minimized. Hereinafter, the structure of the third region R3 of the upper electrode 12 of the liquid crystal display device 100 of this embodiment will be described in comparison with the upper electrode 12' of a liquid crystal display device 1000 illustrated as a comparative example in FIGS. 7 and 8. FIG. 7 is a plan view schematically illustrating a single pixel of a liquid crystal display device 1000 as a comparative example. FIG. 8 is a plan view illustrating only the upper electrode 12' of the liquid crystal display device 1000 of the comparative example.

In both of the liquid crystal display device 100 of this embodiment and the liquid crystal display device 1000 of the comparative example, supposing a virtual line L1 which splits each pixel into two regions which are adjacent to each other in the row direction (i.e., which splits each pixel into two horizontally) is drawn, the center of the contact hole CH is not located on that virtual line L1 (which will be referred to herein as a "horizontally splitting line") as shown in FIGS. 1 and 7.

The first and second regions R1 and R2 of the upper electrode 12' of the liquid crystal display device 1000 as the comparative example have the same electrode structures as the first and second regions R1 and R2 of the upper electrode of the liquid crystal display device 100 of this embodiment.

The third region R3 of the upper electrode 12 of the liquid crystal display device 100 of this embodiment includes a symmetrical connecting portion 12c which has a shape that is substantially symmetrical with respect to the horizontally splitting line L1 as shown in FIG. 3. In FIG. 3, only the symmetrical connecting portion 12c is shadowed to make it recognizable easily. In the configuration shown in FIG. 3, the symmetrical connecting portion 12c is connected to (i.e., continuous with) the leftmost and rightmost branch portions 12b of the first region R1.

On the other hand, the third region R3' of the upper electrode 12' in the liquid crystal display device 1000 as the comparative example does not have such a conductive film pattern, of which the shape is substantially symmetrical with respect to the horizontally splitting line L1, and the conductive film in the third region R' has quite an asymmetrical shape horizontally and is continuous with only the rightmost branch portion 12b of the first region R1 as shown in FIG. 8. Since the upper electrode 12' gets depressed significantly over the contact hole CH (as can be seen easily from FIG. 2), the application of a voltage initiates a change in the orientations of the liquid crystal molecules 31 from those located over the contact hole CH in the third region R3 to begin with, separately from the change in the orientations in the first and second regions R1 and R2. In this case, if the conductive film in the third region R3' had quite an asymmetrical shape horizontally, then the change in the orientations to start from the liquid crystal molecules 31 over the contact hole CH would propagate differently between the right and left portions of the pixel, and the orientations of the liquid crystal molecules 31 would also be significantly asymmetrical horizontally, thus causing an adverse effect on the display operation. On top of that, if the area of the conductive film accounted for a significant percentage of the third region R3', the horizontally asymmetrical alignment controlling force produced from the third region R3' would be too great to achieve an intended alignment state in some cases.

In contrast, if the third region R3 of the upper electrode 12 has a symmetrical connecting portion 12c (as a part of the conductive film pattern) which is substantially symmetrical with respect to the horizontally splitting line L1 as in the liquid crystal display device 100 of this embodiment, then approximately equal alignment controlling forces will be applied to the liquid crystal molecules 31 in the right and left halves of each pixel in the third region R3. As a result, the alignment in the liquid crystal layer 30 will be closer to a horizontally symmetrical one and get stabilized.

Figure 9:
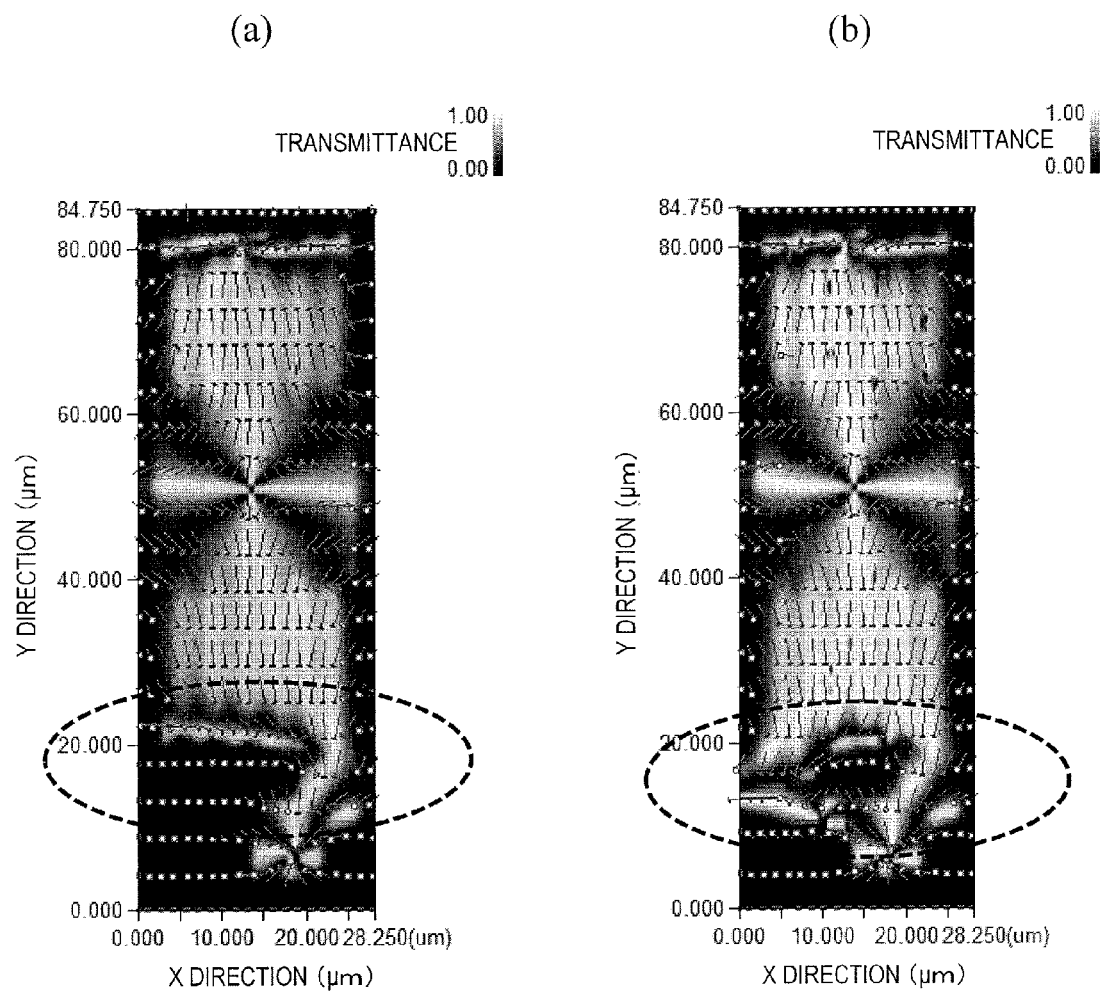
FIG. 9 (a) shows the results of simulations which were carried out on the liquid crystal display device 1000 of the comparative example to see how the alignment state of the liquid crystal molecules 31 and the optical transmittance changed with a voltage applied. (b) shows the results of simulations which were carried out on the liquid crystal display device 100 according to an embodiment of the present invention to see how the alignment state of the liquid crystal molecules 31 and the optical transmittance changed with a voltage applied.

FIG. 9(a) shows the results of simulations which were carried out on the liquid crystal display device 1000 of the comparative example to see how the alignment state of the liquid crystal molecules 31 and the optical transmittance changed with a voltage applied. On the other hand, FIG. 9(b) shows the results of simulations which were carried out on the liquid crystal display device 100 of this embodiment to see how the alignment state of the liquid crystal molecules 31 and the optical transmittance changed with a voltage applied. The simulations were carried out on the supposition that the pixel had a horizontal length (i.e., a length as measured in the X direction) of 28.25 μm and a vertical length (i.e., a length as measured in the Y direction) of 84.75 μm and a voltage of 5.0 V was applied to the liquid crystal layer 30.

As can be seen from FIG. 9(a), in the liquid crystal display device 1000 of the comparative example, the orientations of the liquid crystal molecules 31 began to change from the ones in the vicinity of the contact hole CH and the change in the orientations propagated onto the lower right portion of the conductive film (i.e., a portion of the conductive film in the third region R3' of the upper electrode 12'). As a result, the liquid crystal molecules 31 could not get aligned as intended in the lower left region of the pixel, and that region looked dark.

On the other hand, in the liquid crystal display device 100 of this embodiment, the change in the orientations propagated smoothly from the lower left and lower right regions of the pixel as can be seen from FIG. 9(b). As a result, the liquid crystal molecules 31 in the lower left region of pixel could also be aligned as intended and that region looked bright.

As can be seen, since the third region R3 of the upper electrode 12 includes the symmetrical connecting portion 12c in the liquid crystal display device 100 of this embodiment, horizontally symmetrical alignments are realized and the display quality can be improved.

(Embodiment 2)

Figure 10:
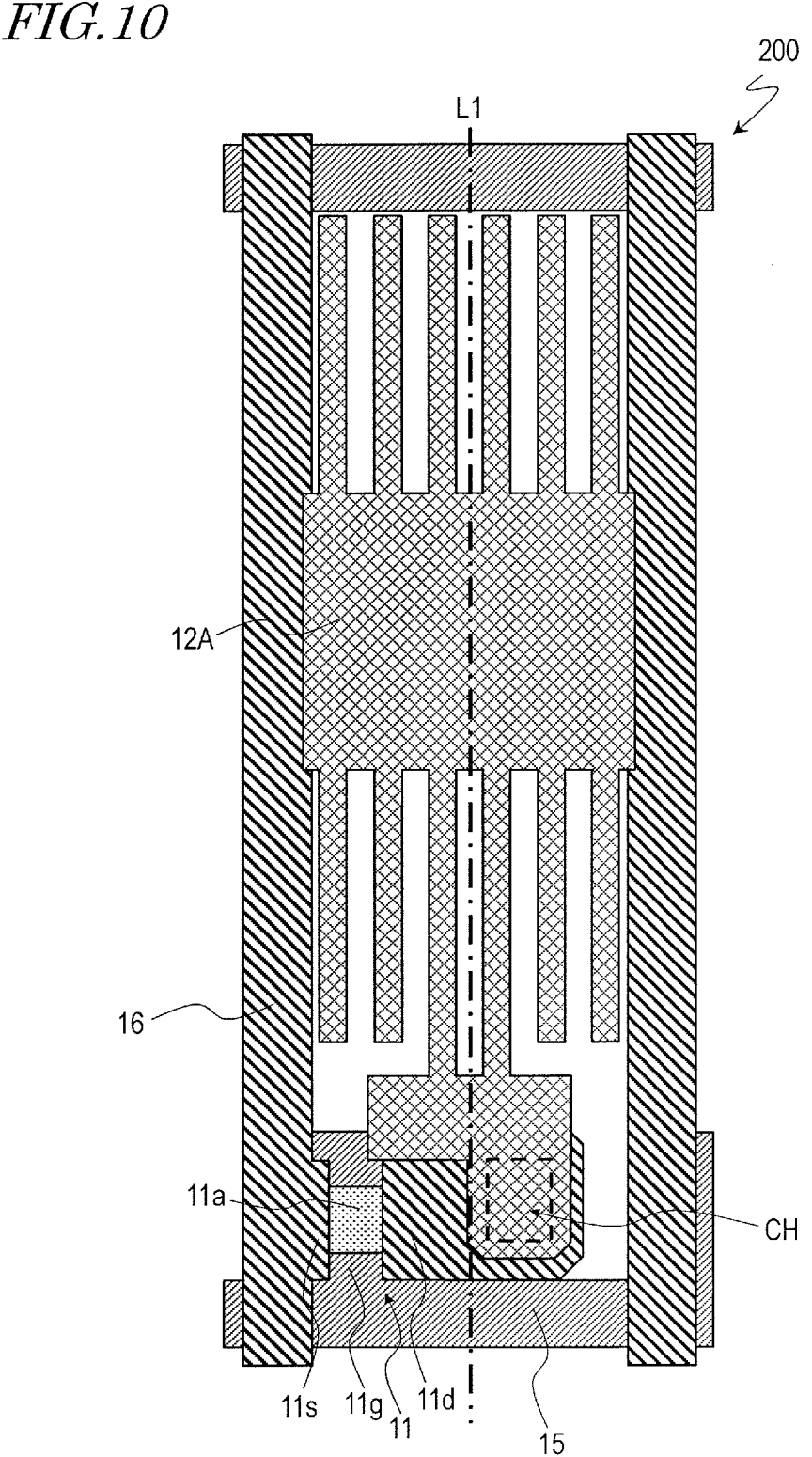
FIG. 10 A plan view schematically illustrating a single pixel of a liquid crystal display device 200 according to an embodiment of the present invention.
Figure 11:
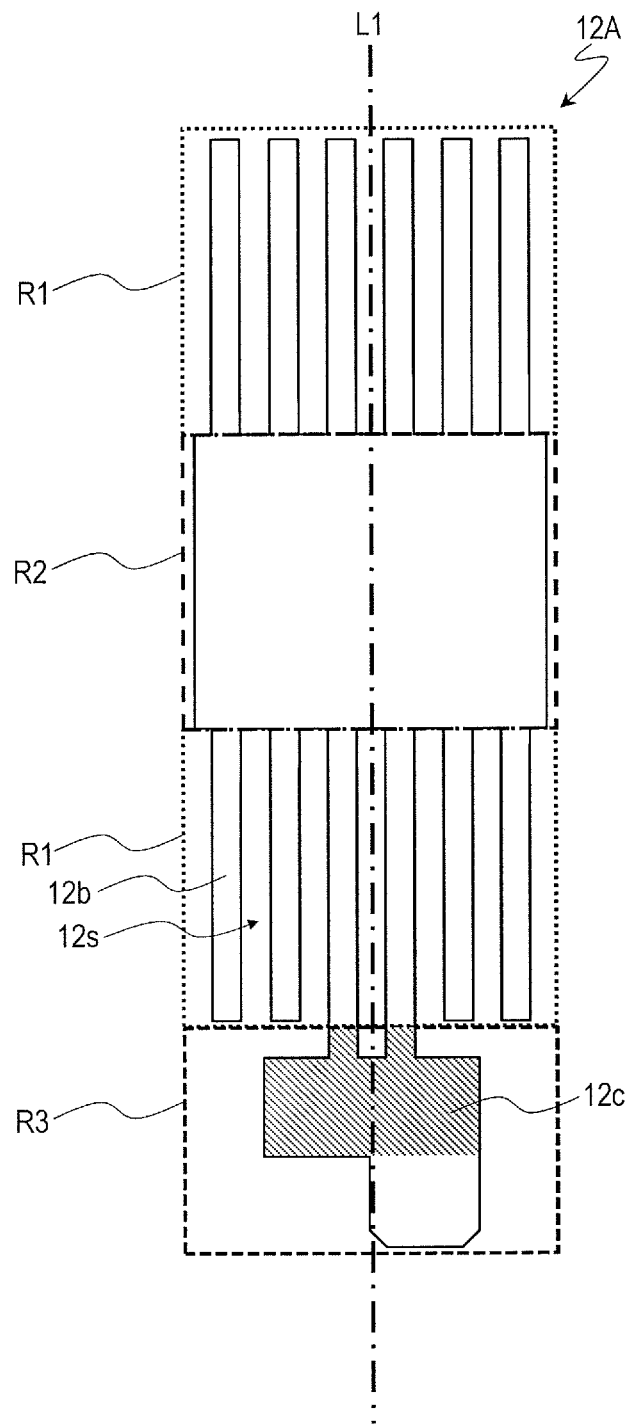
FIG. 11 A plan view schematically illustrating the upper electrode 12A that the liquid crystal display device 200 according to the embodiment of the present invention has.

Hereinafter, a liquid crystal display device 200 as a second embodiment of the present invention will be described with reference to FIGS. 10 and 11. FIG. 10 is a plan view schematically illustrating a single pixel of the liquid crystal display device 200. FIG. 11 is a plan view illustrating only the upper electrode 12A of the liquid crystal display device 200. The following description of the liquid crystal display device 200 of the second embodiment will be focused on only differences from the liquid crystal display device 100 of the first embodiment.

Just like the upper electrode 12 of the liquid crystal display device 100 of the first embodiment, the upper electrode 12A of the liquid crystal display device 200 of this embodiment also has first, second and third regions R1, R2 and R3.

The first and second regions R1 and R2 of the upper electrode 12A in this liquid crystal display device 200 have the same electrode structures as the first and second regions R1 and R2 of the upper electrode 12 in the liquid crystal display device 100 of the first embodiment.

On the other hand, the third region R3 of the upper electrode 12A in this liquid crystal display device 200 has a somewhat different electrode structure from the third region R3 of the upper electrode 12 in the liquid crystal display device 100 of the first embodiment. Specifically, in the liquid crystal display device 100 of the first embodiment, the symmetrical connecting portion 12c of the third region R3 of the upper electrode 12 is continuous with the leftmost and rightmost branch portions 12b of the first region R1 as shown in FIG. 3. Meanwhile, in the liquid crystal display device 200 of this embodiment, the symmetrical connecting portion 12c of the third region R3 of the upper electrode 12A is continuous with two central branch portions 12b of the first region R1 as shown in FIG. 11.

In the liquid crystal display device 200 of this embodiment, the third region R3 of the upper electrode 12A also includes the symmetrical connecting portion 12c that is a conductive film pattern, of which the shape is substantially symmetrical with respect to the horizontally splitting line L1. That is why approximately equal alignment controlling forces will be applied to the liquid crystal molecules 31 in the right and left halves of each pixel in the third region R3. As a result, the alignment in the liquid crystal layer 30 will be closer to a horizontally symmetrical one and get stabilized. Consequently, the display quality improves.

Figure 12:
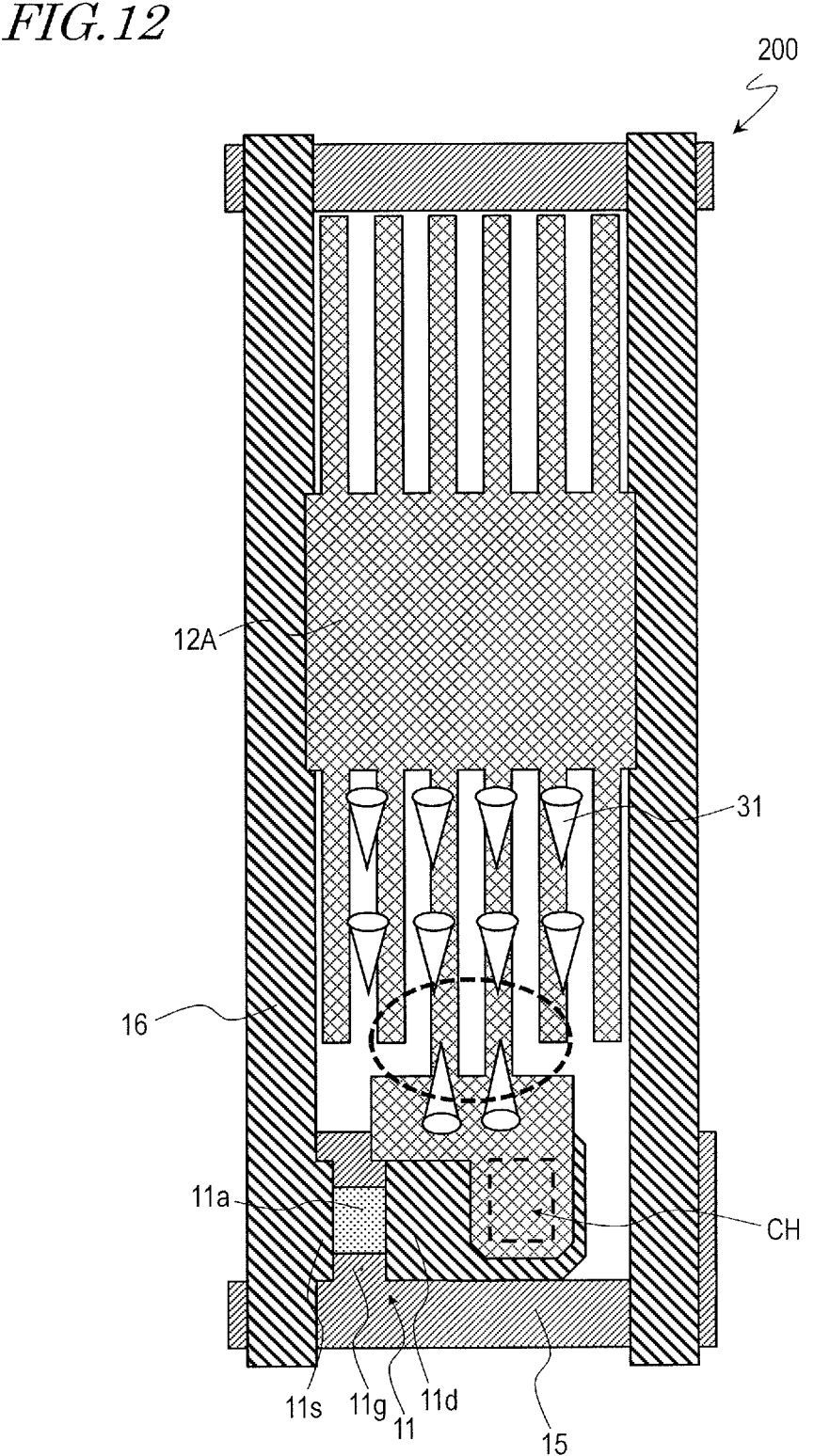
FIG. 12 A plan view schematically illustrating a single pixel of a liquid crystal display device 200 according to an embodiment of the present invention.

In the liquid crystal display device 200 of this embodiment, the symmetrical connecting portion 12c of the third region R3 is continuous with the central branch portions 12b of the first region R1. That is why the area of a portion of the upper electrode 12 which is located close to the signal lines 16 decreases, and therefore, the parasitic capacitance to be produced between the signal lines 16 and the upper electrode 12 can be reduced, which is also beneficial. On the other hand, in the liquid crystal display device 100 of the first embodiment, the symmetrical connecting portion 12c of the third region R3 is continuous with the leftmost and rightmost branch portions 12b of the first region R1. Consequently, the liquid crystal molecules 31 will have the same alignment direction over the same branch portion 12b, and it is possible to prevent the liquid crystal molecules 31 from having opposite alignment directions within a region corresponding to a single branch portion 12 and causing a dark line there. On the other hand, in this liquid crystal display device 200, the alignment directions of the liquid crystal molecules 31 will invert where the central branch portions 12b are connected to the symmetrical connecting portion 12c (as indicated by the dashed circle in FIG. 12), and the alignment boundary will be sensed as a dark line as schematically illustrated in FIG. 12. And if such a dark line appears in the area contributing to the display operation within the pixel, the transmittance will decrease.

Figure 13:
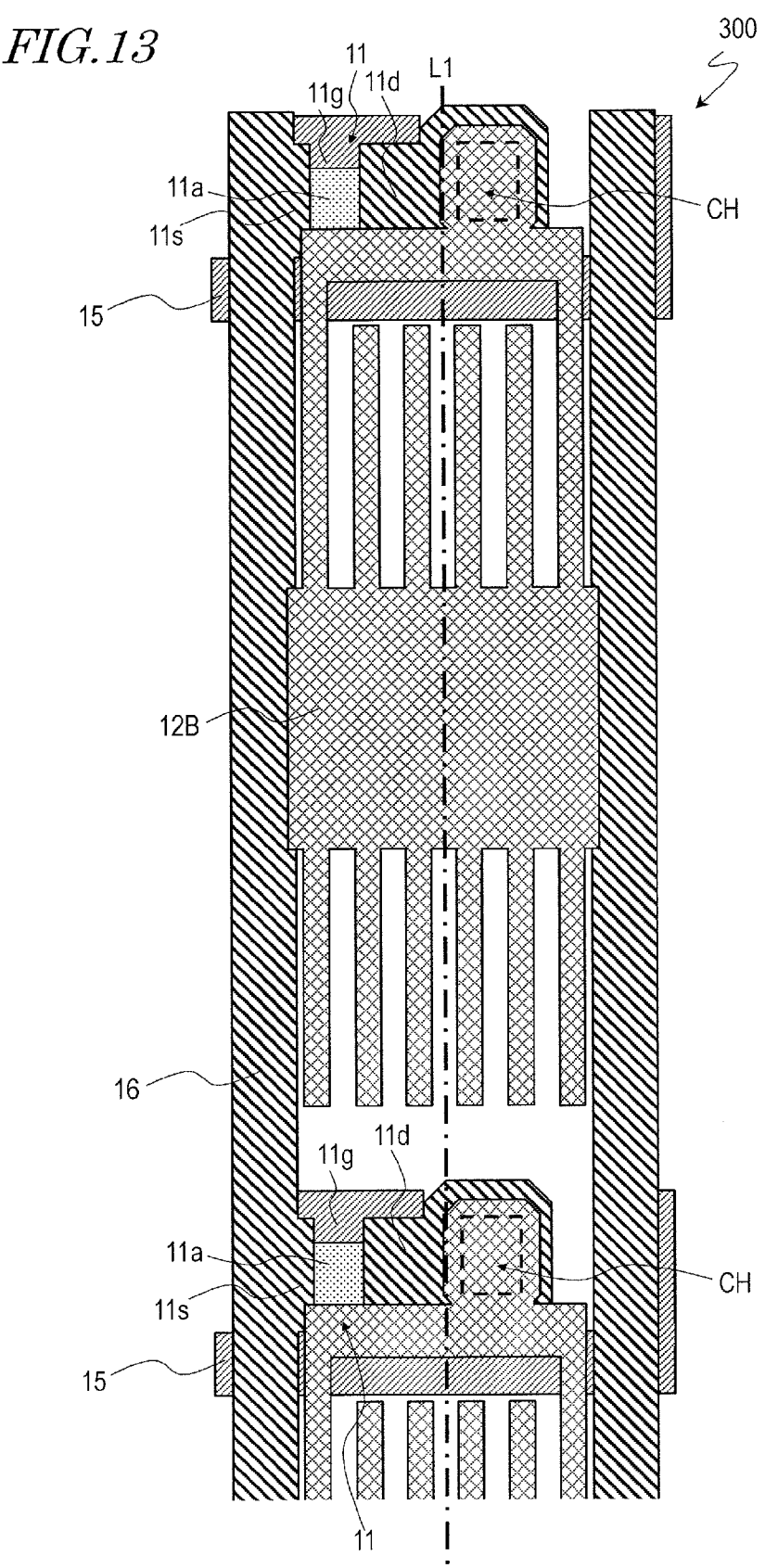
FIG. 13 A plan view schematically illustrating a single pixel of a liquid crystal display device 300 according to an embodiment of the present invention.
Figure 14:
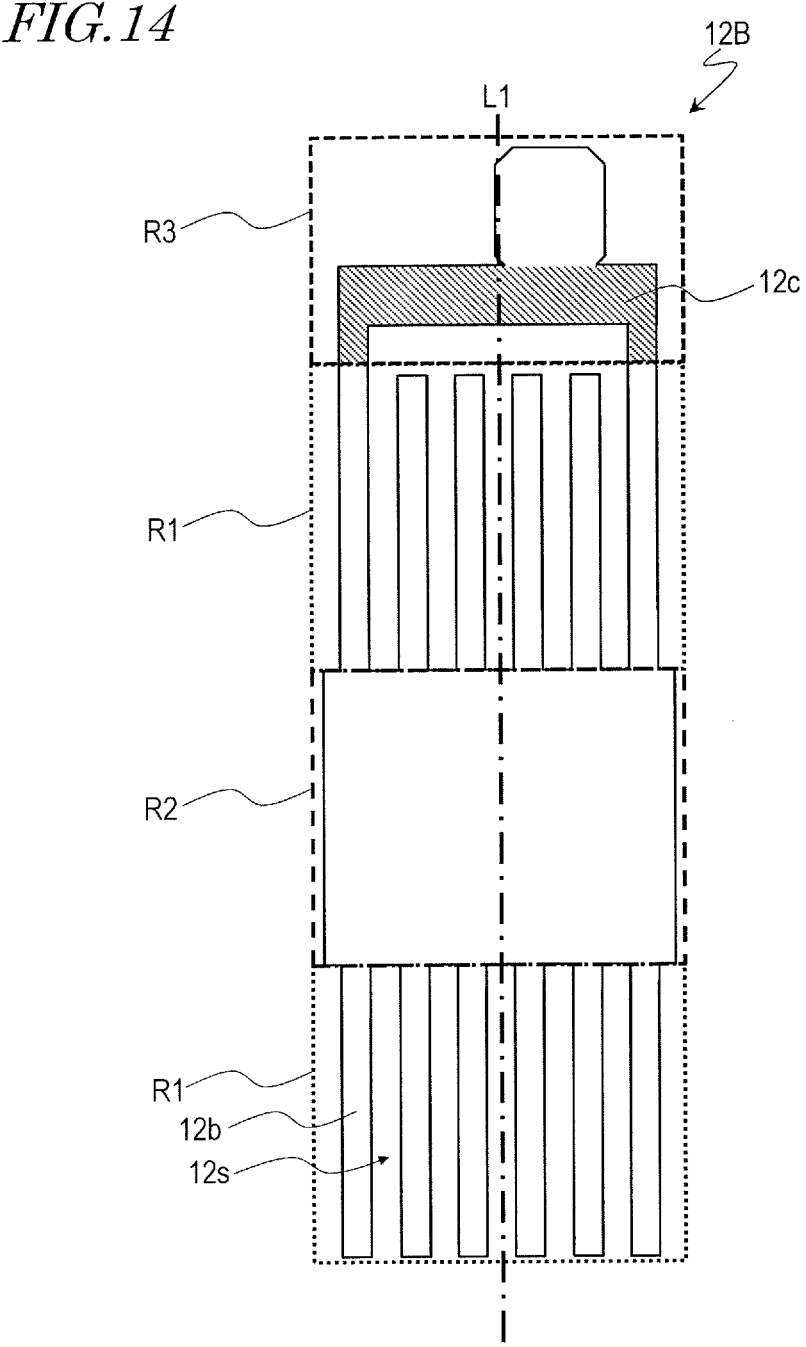
FIG. 14 A plan view schematically illustrating the upper electrode 12B that the liquid crystal display device 300 according to the embodiment of the present invention has.

Next, another liquid crystal display device 300 according to this embodiment will be described with reference to FIGS. 13 and 14. FIG. 13 is a plan view schematically illustrating a single pixel of the liquid crystal display device 300. FIG. 14 is a plan view illustrating only the upper electrode 12B of the liquid crystal display device 300. The following description of the liquid crystal display device 300 of the second embodiment will be focused on only differences from the liquid crystal display device 100 of the first embodiment.

In the liquid crystal display device 100 of the first embodiment, the upper electrode 12 is connected to the TFT 11 which is located under the upper electrode 12 as shown in FIG. 1. On the other hand, in the liquid crystal display device 300 of this embodiment, the upper electrode 12B is connected to the TFT 11 which is located over the upper electrode 12B as shown in FIG. 13. That is to say, although each pixel is scanned by the scan line 15 which is located under the pixel in the liquid crystal display device 100 of the first embodiment, each pixel is scanned by the scan line which is located over the pixel in the liquid crystal display device 300 of this embodiment.

In the liquid crystal display device 300 of this embodiment, the third region R3 of the upper electrode 12B also includes the symmetrical connecting portion 12c that is a conductive film pattern, of which the shape is substantially symmetrical with respect to the horizontally splitting line L1 as shown in FIG. 14. That is why approximately equal alignment controlling forces will be applied to the liquid crystal molecules 31 in the right and left halves of each pixel in the third region R3. As a result, the alignment in the liquid crystal layer 30 will be closer to a horizontally symmetrical one and get stabilized. Consequently, the display quality improves.

(Embodiment 3)

Figure 15:
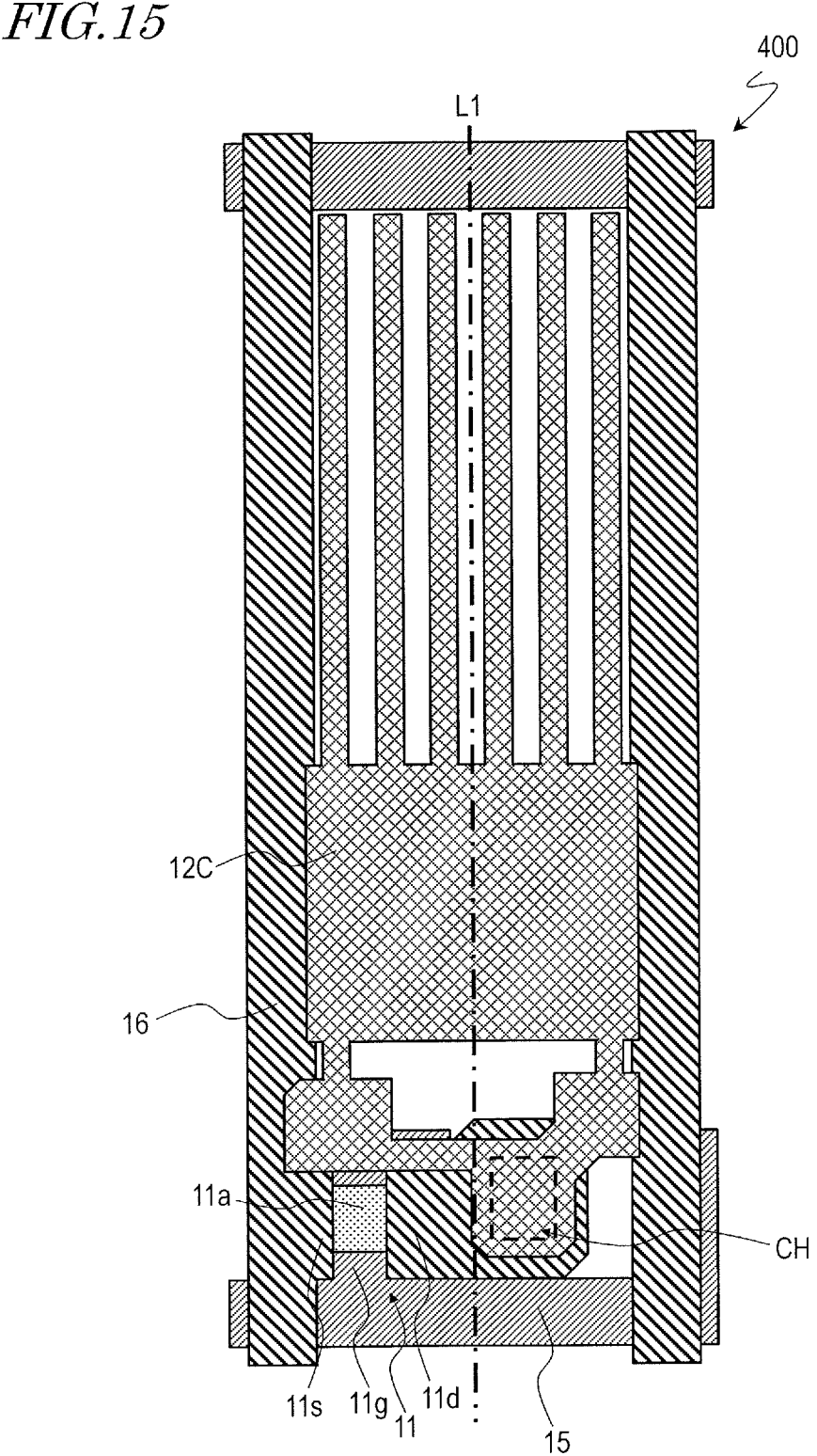
FIG. 15 A plan view schematically illustrating a single pixel of a liquid crystal display device 400 according to an embodiment of the present invention.
Figure 16:
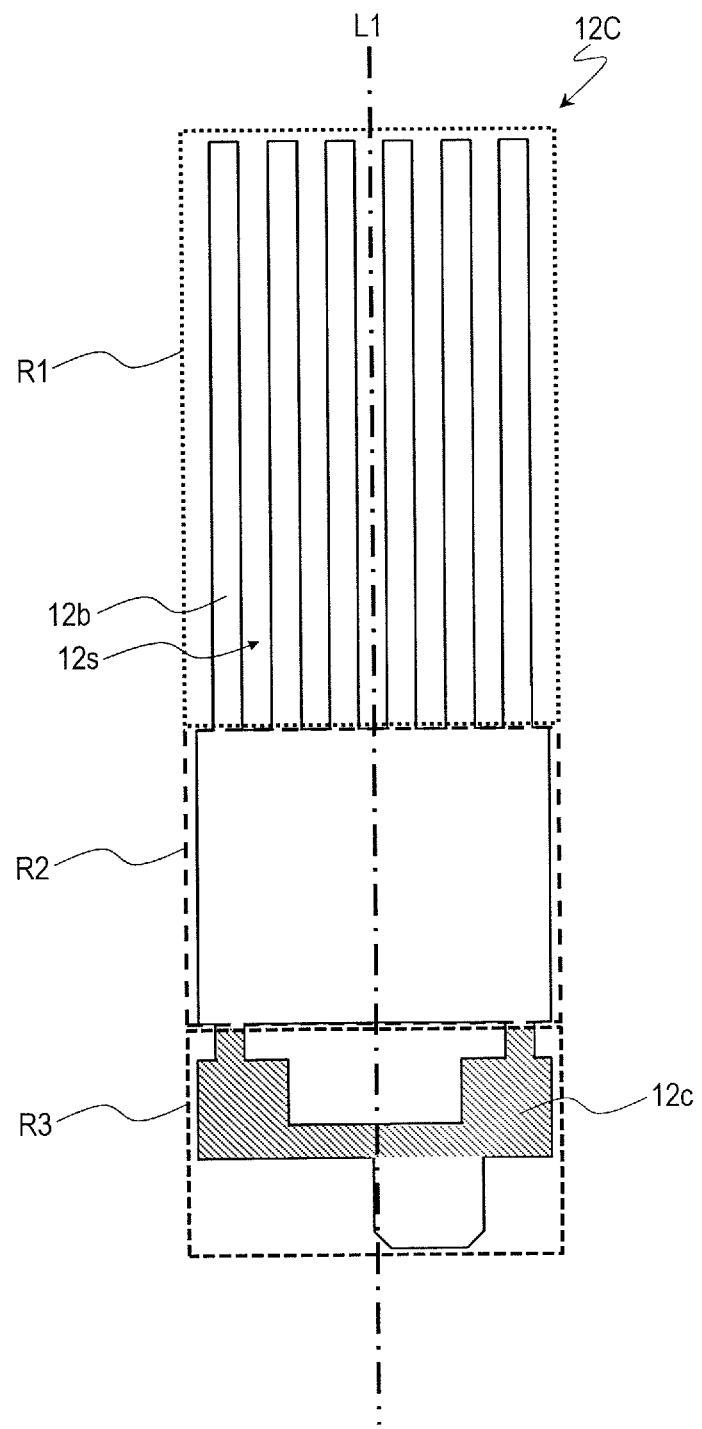
FIG. 16 A plan view schematically illustrating the upper electrode 12C that the liquid crystal display device 400 according to the embodiment of the present invention has.

Hereinafter, a liquid crystal display device 400 as a third embodiment of the present invention will be described with reference to FIGS. 15 and 16. FIG. 15 is a plan view schematically illustrating a single pixel of the liquid crystal display device 400. FIG. 16 is a plan view illustrating only the upper electrode 12C of the liquid crystal display device 400. The following description of the liquid crystal display device 400 of the third embodiment will be focused on only differences from the liquid crystal display device 100 of the first embodiment.

Just like the upper electrode 12 of the liquid crystal display device 100 of the first embodiment, the upper electrode 12C of the liquid crystal display device 400 of this embodiment also has first, second and third regions R1, R2 and R3.

However, although the upper electrode 12 has two first regions R1 in the liquid crystal display device 100 of the first embodiment, the upper electrode 12C has only one first region R1 in the liquid crystal display device 400 of this embodiment. Specifically, the first region R1 is located in an upper part of the pixel, and the second region R2 is located under the first region R1. Thus, the third region R3 of the upper electrode 13C is continuous with (i.e., connected to) the second region R2.

In the liquid crystal display device 400 of this embodiment, the third region R3 of the upper electrode 12C also includes the symmetrical connecting portion 12c that is a conductive film pattern, of which the shape is substantially symmetrical with respect to the horizontally splitting line L1. That is why approximately equal alignment controlling forces will be applied to the liquid crystal molecules 31 in the right and left halves of each pixel in the third region R3. As a result, the alignment in the liquid crystal layer 30 will be closer to a horizontally symmetrical one and get stabilized. Consequently, the display quality improves.

Figure 17:
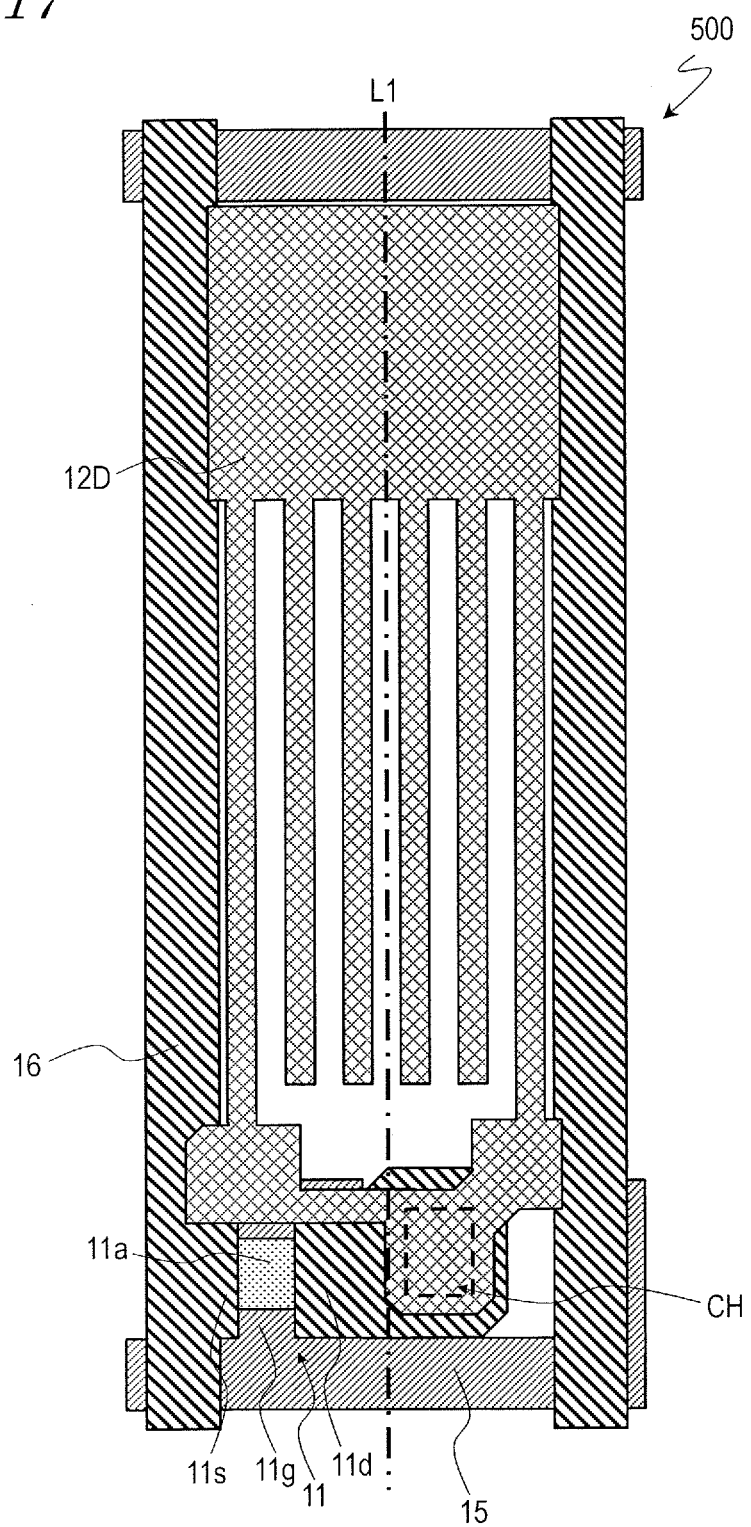
FIG. 17 A plan view schematically illustrating a single pixel of a liquid crystal display device 500 according to an embodiment of the present invention.
Figure 18:
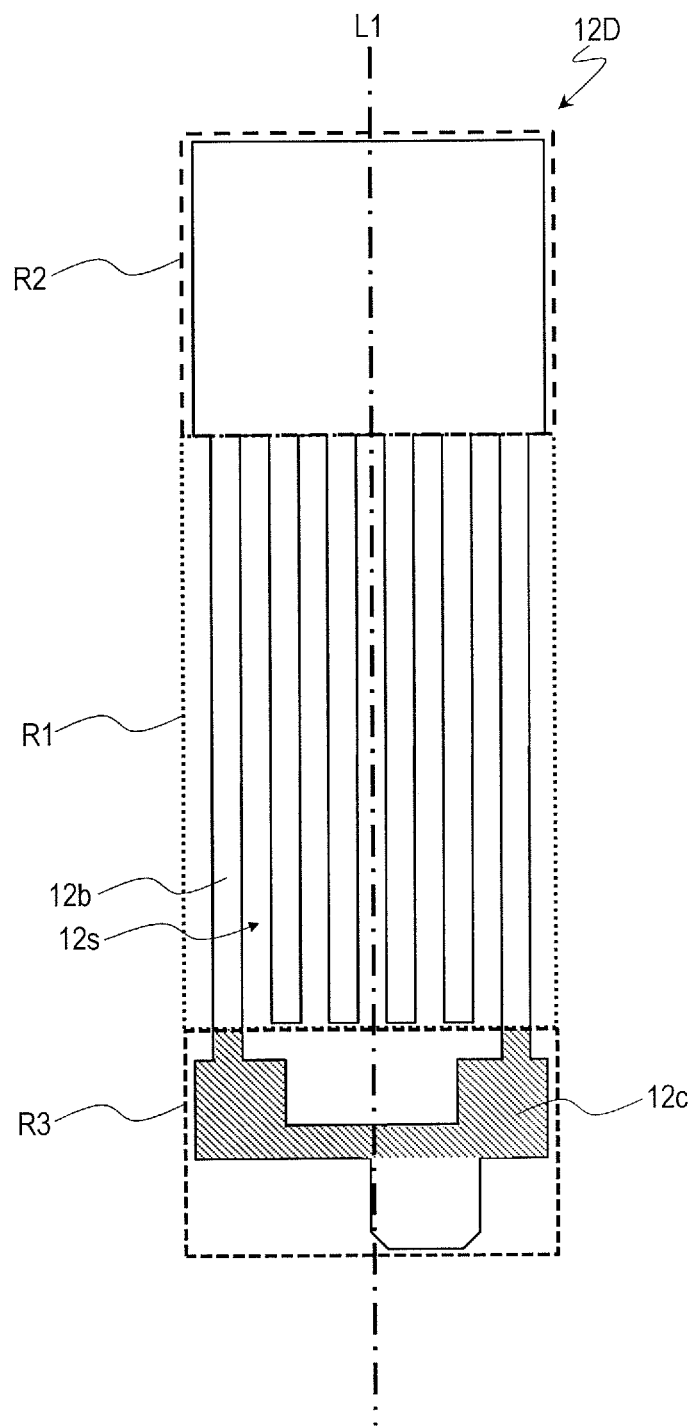
FIG. 18 A plan view schematically illustrating the upper electrode 12D that the liquid crystal display device 500 according to the embodiment of the present invention has.

Next, another liquid crystal display device 500 according to this embodiment will be described with reference to FIGS. 17 and 18. FIG. 17 is a plan view schematically illustrating a single pixel of the liquid crystal display device 500. FIG. 18 is a plan view illustrating only the upper electrode 12D of the liquid crystal display device 500.

The upper electrode 12D of the liquid crystal display device 500 also has only one first region R1. Specifically, the second region R2 is located in an upper part of the pixel, and the first region R1 is located under the second region R2. Thus, the third region R3 of the upper electrode 13D is continuous with (i.e., connected to) the first region R1.

In this liquid crystal display device 500, the third region R3 of the upper electrode 12D also includes the symmetrical connecting portion 12c that is a conductive film pattern, of which the shape is substantially symmetrical with respect to the horizontally splitting line L1. That is why approximately equal alignment controlling forces will be applied to the liquid crystal molecules 31 in the right and left halves of each pixel in the third region R3. As a result, the alignment in the liquid crystal layer 30 will be closer to a horizontally symmetrical one and get stabilized. Consequently, the display quality improves.

In the liquid crystal display devices 400 and 500 of this embodiment, the upper electrode 12C, 12D of each pixel has only one first region R1, and therefore, the liquid crystal molecules 31 are aligned in only one direction in a dark region of the pixel. On the other hand, in the liquid crystal display devices 100, 200 and 300 of the first and second embodiments, the upper electrode 12, 12A, 12B of each pixel has two first regions R1, and the liquid crystal molecules 31 are aligned in two directions in a dark region of the pixel. That is why from the standpoint of improving the viewing angle characteristic in the dark region sufficiently, the liquid crystal display devices 100, 200, 300 of the first and second embodiments are preferred.

(Embodiment 4)

Figure 19:
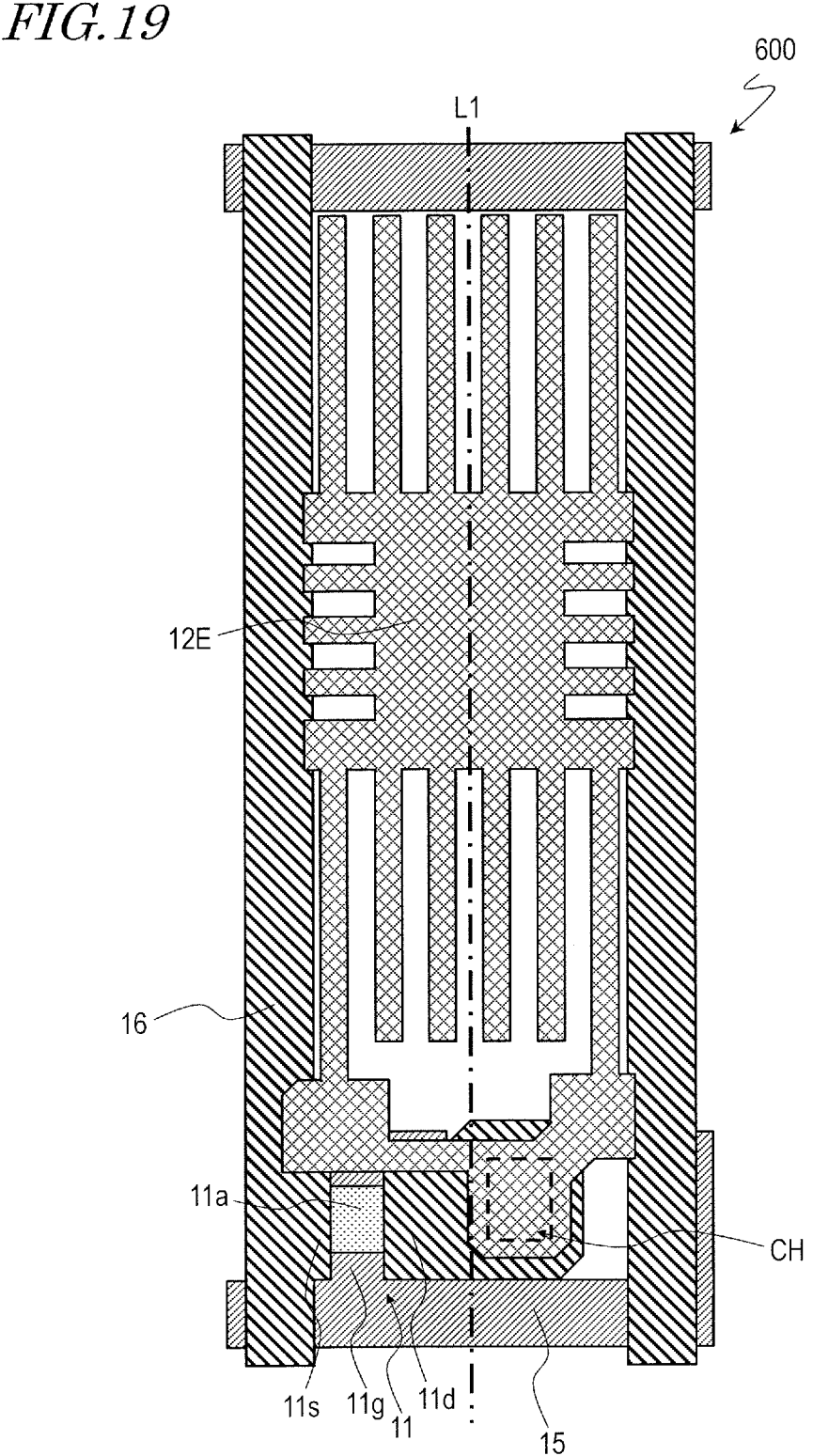
FIG. 19 A plan view schematically illustrating a single pixel of a liquid crystal display device 600 according to an embodiment of the present invention.
Figure 20:
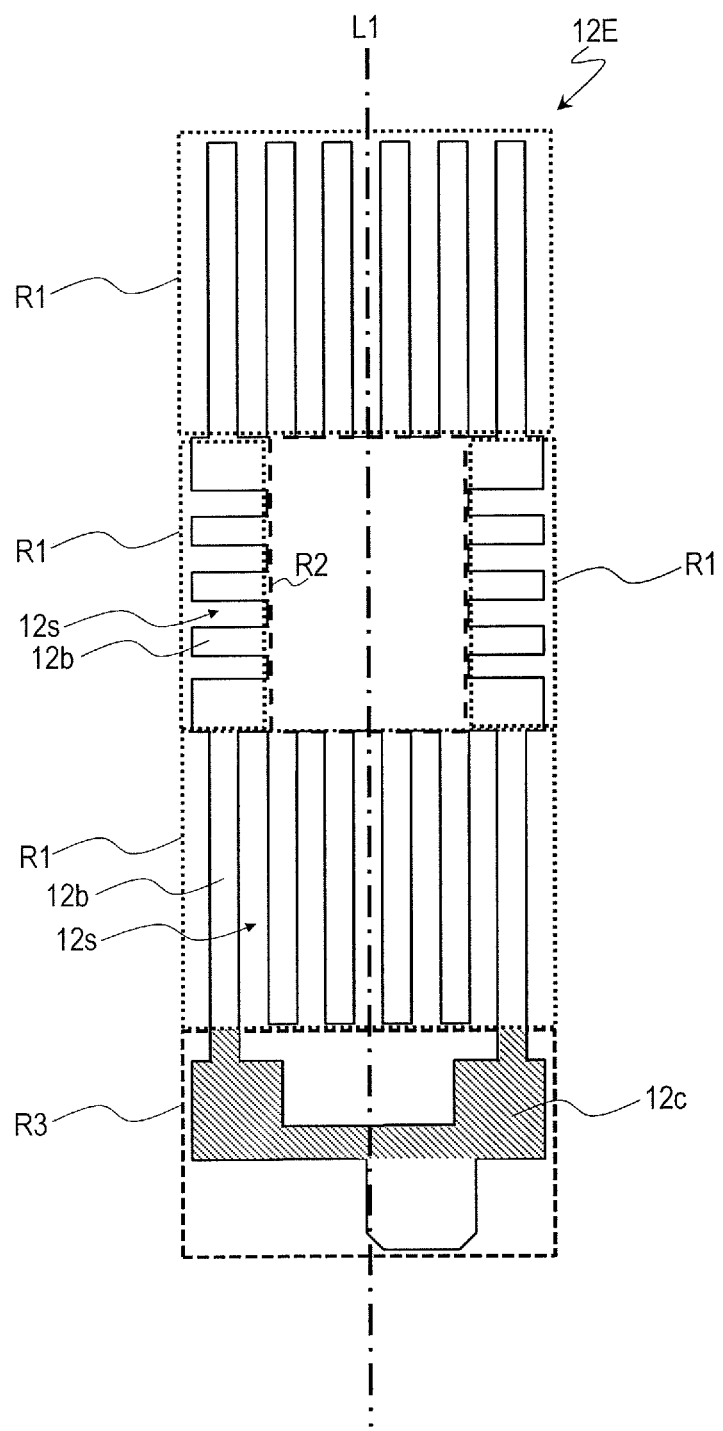
FIG. 20 A plan view schematically illustrating the upper electrode 12E that the liquid crystal display device 600 according to the embodiment of the present invention has.

Hereinafter, a liquid crystal display device 600 as a fourth embodiment of the present invention will be described with reference to FIGS. 19 and 20. FIG. 19 is a plan view schematically illustrating a single pixel of the liquid crystal display device 600. FIG. 20 is a plan view illustrating only the upper electrode 12E of the liquid crystal display device 600. The following description of the liquid crystal display device 600 of the fourth embodiment will be focused on only differences from the liquid crystal display device 100 of the first embodiment.

In the liquid crystal display device 600 of this embodiment, the upper electrode 12E has four first regions R1, which is a major difference from the liquid crystal display device 100 of the first embodiment. Specifically, the upper electrode 12E includes not only the pair of first regions R1 which are located over and under the second region R2 but also another pair of first regions R1 which are located on the left- and right-hand sides of the second region R2. In the latter pair of first regions R1, the slits 12s and the branch portions 12b run substantially perpendicularly to the direction in which the slits 12s and branch portions 12b run in the former pair of first regions R1. That is why the liquid crystal molecules 31 over the latter pair of first regions R1 are aligned substantially perpendicularly to the liquid crystal molecules 31 over the former pair of first regions R1. Also, the alignment direction in the region of the liquid crystal layer 30 over the first region R1 on the left-hand side of the second region R2 is different by approximately 180 degrees from the alignment direction in the region of the liquid crystal layer 30 over the first region R1 on the right-hand side of the second region R2. As a result, in the liquid crystal display device 600 of this embodiment, the liquid crystal molecules 31 are aligned in four directions in the dark region of the pixel. Consequently, the viewing angle characteristic can be further improved.

Figure 21:
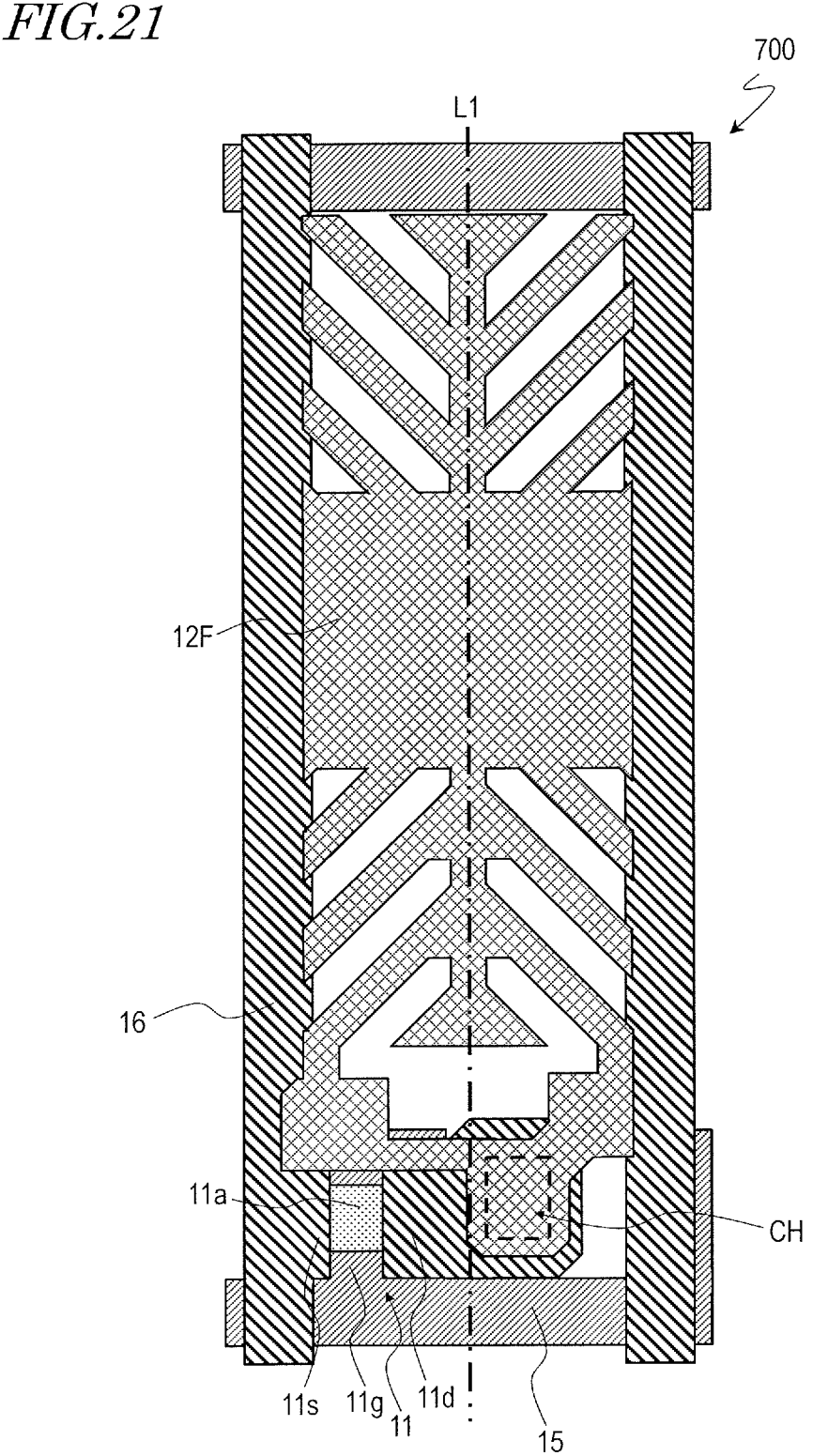
FIG. 21 A plan view schematically illustrating a single pixel of a liquid crystal display device 700 according to an embodiment of the present invention.
Figure 22:
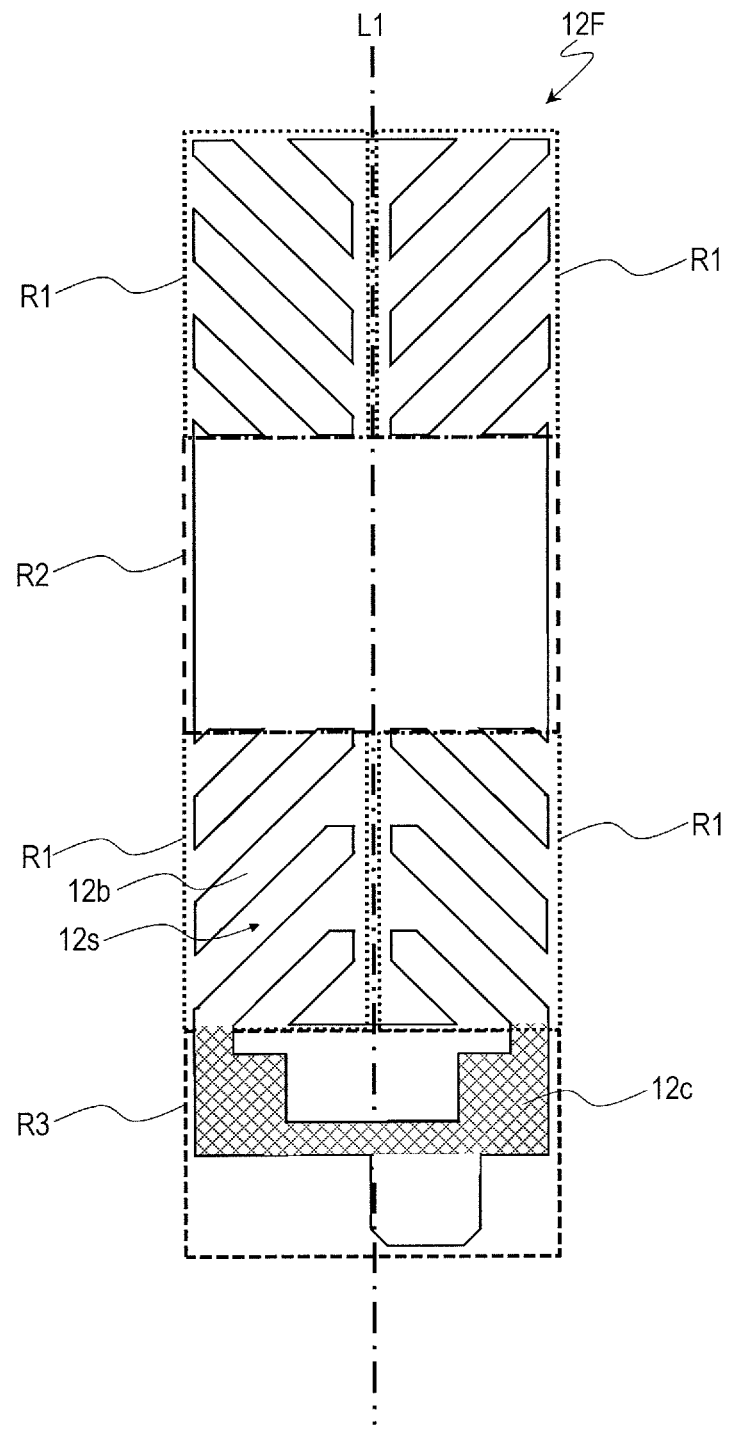
FIG. 22 A plan view schematically illustrating the upper electrode 12F that the liquid crystal display device 700 according to the embodiment of the present invention has.

Next, another liquid crystal display device 700 according to this embodiment will be described with reference to FIGS. 21 and 22. FIG. 21 is a plan view schematically illustrating a single pixel of the liquid crystal display device 700. FIG. 22 is a plan view illustrating only the upper electrode 12F of the liquid crystal display device 700.

In this liquid crystal display device 700, the upper electrode 12F also has four first regions R1. And in the dark region of the pixel, the liquid crystal molecules 31 are also aligned in four different directions. However, although the slits 12s and branch portions 12b run either substantially parallel or substantially perpendicularly to the row and column directions in the four first regions R1 that the upper electrode 12E of the liquid crystal display device 600 has, the slits 12s and branch portions 12b run in a direction that defines an angle of approximately 45 degrees with respect to the row and column directions in the four first regions R1 that the upper electrode 12F of this liquid crystal display device 700 has.

In addition, in the upper electrode 12F of this liquid crystal display device 700, the four first regions R1 have substantially equal areas. Consequently, the viewing angle characteristic can be improved even more effectively.

INDUSTRIAL APPLICABILITY

Embodiments of the present invention provide a liquid crystal display device which has an excellent viewing angle characteristic and each pixel of which has a sufficiently high optical transmittance. A liquid crystal display device as an embodiment of the present invention can conduct a display operation with high quality even when its definition is high and its pixel size is small.

REFERENCE SIGNS LIST 10 active-matrix substrate (TFT substrate)
10a insulating substrate
11 thin-film transistor (TFT)
11a semiconductor layer
11g gate electrode
11s source electrode
11d drain electrode
12, 12A, 12B, 12C, 12D, 12E, 12F upper electrode
12b branch portion
12c symmetrical connecting portion
12s slit
13 lower electrode
14 dielectric layer
15 scan line (gate bus line)
16 signal line (source bus line)
17 gate insulating layer
18 interlayer insulating layer
18a inorganic insulating film
18b organic insulating film
20 counter substrate
20a insulating substrate
21 counter electrode
30 liquid crystal layer
31 liquid crystal molecules
40a, 40b polarizer
CH contact hole
R1 upper electrode's first region
R2 upper electrode's second region
R3 upper electrode's third region
100, 200, 300, 400 liquid crystal display device
500, 600, 700 liquid crystal display device

The invention claimed is:

1. A liquid crystal display device comprising:
an active-matrix substrate;
a counter substrate which faces the active-matrix substrate; and
a liquid crystal layer which is interposed between the active-matrix substrate and the counter substrate,
the liquid crystal display device including a plurality of pixels which are arranged in columns and rows to form a matrix pattern,
wherein the active-matrix substrate includes:
a thin-film transistor which is provided for each of the plurality of pixels and which includes a gate electrode, a source electrode, and a drain electrode;
an upper electrode which is electrically connected to the drain electrode of the thin-film transistor;
a lower electrode which is arranged under the upper electrode; and
a dielectric layer which is arranged between the upper and lower electrodes,
the counter substrate includes a counter electrode which faces the upper electrode,
the upper electrode has first and second regions which have mutually different electrode structures, and a third region which electrically connects the first and second regions to the drain electrode, and
the third region of the upper electrode includes a symmetrical connecting portion that is a conductive film pattern, of which the shape is substantially symmetrical with respect to a virtual line that splits each pixel into two adjacent regions in a row direction; wherein
the active-matrix substrate further includes an interlayer insulating layer which is provided to cover the thin-film transistor,
a contact hole is formed in the interlayer insulating layer and the dielectric layer so that the drain electrode is partially exposed in the contact hole and that the third region of the upper electrode is electrically connected to the drain electrode inside the contact hole, and
the center of the contact hole is located off the virtual line.

2. The liquid crystal display device of claim 1, wherein the active-matrix substrate further includes:

a scan line which is extended substantially parallel to the row direction and which is electrically connected to the gate electrode of the thin-film transistor; and a signal line which is extended substantially parallel to the column direction and which is electrically connected to the source electrode of the thin-film transistor.

3. The liquid crystal display device of claim 1, wherein an electric field to be generated in a region of the liquid crystal layer over the first region of the upper electrode and an electric field to be generated in another region of the liquid crystal layer over the second region of the upper electrode when a voltage is applied to the liquid crystal layer have mutually different directions and/or intensities.

4. The liquid crystal display device of claim 1, wherein a plurality of slits are formed in the first region of the upper electrode, but no slits are formed in the second region of the upper electrode; and if a particular one of the plurality of pixels displays a predetermined half-scale tone, the luminance in a region of the particularly pixel corresponding to the first region of the upper electrode is lower than the luminance in another region of the particular pixel corresponding to the second region of the upper electrode.

5. The liquid crystal display device of claim 4, wherein when a voltage is applied to the liquid crystal layer, liquid crystal molecules are aligned substantially parallel to the slits in a region of the liquid crystal layer over the first region of the upper electrode, and liquid crystal molecules are aligned radially in another region of the liquid crystal layer over the second region of the upper electrode.

6. The liquid crystal display device of claim 4, wherein the third region of the upper electrode is continuous with the first region.

7. The liquid crystal display device of claim 4, wherein the third region of the upper electrode is continuous with the second region.

8. The liquid crystal display device of claim 1, wherein the liquid crystal layer is a vertical alignment liquid crystal layer.

9. The liquid crystal display device of claim 8, wherein at least one of the active-matrix substrate and the counter substrate includes a vertical alignment film and an alignment sustaining layer which is arranged between the vertical alignment film and the liquid crystal layer and which defines the pretilt azimuth of liquid crystal molecules when no voltage is applied to the liquid crystal layer.

10. The liquid crystal display device of claim 1, wherein mutually different potentials are applied to the upper and lower electrodes.

11. The liquid crystal display device of claim 1, wherein the upper and lower electrodes are each made of a transparent conductive material.

12. The liquid crystal display device of claim 1, wherein when viewed along a normal to a display screen, the upper electrode overlaps at least partially with the lower electrode with the dielectric layer interposed between them, and the upper electrode, the dielectric layer and the lower electrode together form a storage capacitor.

13. The liquid crystal display device of claim 1, further comprising a pair of polarizers which face each other with the liquid crystal layer interposed between them.

14. The liquid crystal display device of claim 1, wherein the thin-film transistor includes an oxide semiconductor layer.

15. The liquid crystal display device of claim 14, wherein the oxide semiconductor layer includes an In—Ga—Zn—O based semiconductor.

* * * * *